US 11,985,703 B2

(12) United States Patent
Zhou

(10) Patent No.: US 11,985,703 B2
(45) Date of Patent: May 14, 2024

(54) METHODS, DEVICES, BASE STATIONS AND TERMINALS FOR TRANSMITTING INFORMATION

(71) Applicant: BEIJING XIAOMI MOBILE SOFTWARE CO., LTD., Beijing (CN)

(72) Inventor: Juejia Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 512 days.

(21) Appl. No.: 17/281,050

(22) PCT Filed: Sep. 29, 2018

(86) PCT No.: PCT/CN2018/108861
§ 371 (c)(1),
(2) Date: Mar. 29, 2021

(87) PCT Pub. No.: WO2020/062182
PCT Pub. Date: Apr. 2, 2020

(65) Prior Publication Data
US 2021/0360695 A1 Nov. 18, 2021

(51) Int. Cl.
*H04W 74/0816* (2024.01)
*H04W 24/10* (2009.01)
*H04W 74/0808* (2024.01)

(52) U.S. Cl.
CPC ....... *H04W 74/0816* (2013.01); *H04W 24/10* (2013.01); *H04W 74/0825* (2013.01)

(58) Field of Classification Search
CPC . H04W 72/0453; H04W 72/21; H04W 72/23; H04W 72/56; H04W 72/121;
(Continued)

(56) References Cited

U.S. PATENT DOCUMENTS

2017/0280475 A1* 9/2017 Yerramalli ............ H04W 72/56
2018/0249494 A1 8/2018 Matsumoto et al.
(Continued)

FOREIGN PATENT DOCUMENTS

CN 106559882 A 4/2017
CN 106559906 A 4/2017
(Continued)

OTHER PUBLICATIONS

State Intellectual Property Office of the People's Republic of China, Office Action and Search Report Issued in Application No. 201880001850.X, Jun. 2, 2021, 12 pages.
(Continued)

*Primary Examiner* — Harun Chowdhury
(74) *Attorney, Agent, or Firm* — Syncoda LLC; Feng Ma

(57) ABSTRACT

An information transmission method includes: determining grant-free uplink transmission configuration information of at least two target UEs, the grant-free uplink transmission configuration information at least comprising LBT detection configuration information of each of the at least two target UEs, the LBT detection configuration information configured to distinguish respective LBT detection priorities of the at least two target UEs for channel collision avoidance, wherein the at least two target UEs share periodic uplink transmission resources in an unlicensed spectrum; and transmitting, to each of the at least two target UEs, the grant-free uplink transmission configuration information, so that any one of the at least two target UEs performs an LBT detection according to the grant-free uplink transmission configuration information, transmits uplink service data through a currently shared uplink transmission resource after the LBT detection succeeds.

18 Claims, 12 Drawing Sheets

Determining the at least two target UEs according to uplink transmission demand information of respective UEs within a preset time range — 10

Determining unlicensed uplink transmission configuration information of at least two target UEs, the unlicensed uplink transmission configuration information at least includes: LBT detection configuration information of each of the at least two target UEs — 11

Transmitting the grant-free uplink transmission configuration information to each of the target UEs — 12

(58) Field of Classification Search
CPC ........... H04W 74/006; H04W 74/0808; H04W 76/27; H04W 74/0816
USPC ................................ 370/252, 328, 329, 330
See application file for complete search history.

(56) References Cited

U.S. PATENT DOCUMENTS

2019/0014596 A1   1/2019  Yang et al.
2019/0313409 A1*  10/2019 Tian ..................... H04W 72/21

FOREIGN PATENT DOCUMENTS

| CN | 106686738  A  | 5/2017  |
| CN | 107295696  A  | 10/2017 |
| CN | 107949067  A  | 4/2018  |
| WO | 2016182387 A1 | 11/2016 |

OTHER PUBLICATIONS

ISA State Intellectual Property Office of the People's Republic of China, Written Opinion of the International Searching Authority Issued in Application No. PCT/CN2018/108861, Jun. 28, 2019, WIPO, 8 pages.
State Intellectual Property Office of the People's Republic of China, Office Action and Search Report Issued in Application No. 201880001850.X, Jan. 26, 2022, 10 pages.
International Search Report in Application No. PCT/CN2018/108861, mailed on Jun. 28, 2019.

* cited by examiner

METHODS, DEVICES, BASE STATIONS AND TERMINALS FOR TRANSMITTING INFORMATION

CROSS-REFERENCE TO RELATED APPLICATIONS

The present application is a national stage of International Application No. PCT/CN2018/108861 filed on Sep. 29, 2018, the disclosure of which is hereby incorporated by reference in its entirety.

TECHNICAL FIELD

The present disclosure relates to the field of communication technology, and in particular to methods, devices, base stations, and terminals for transmitting information.

BACKGROUND

As the mobile communication network gradually evolves to the 5G New Radio (NR) system, the mobile communication system has opened up many new frequency resources for transmitting information. Adoption of high-spectrum is one feature of the new mobile communication systems such as the 5G NR system. Another feature of the new spectrums opened up in the new mobile communication system is that unlicensed spectrums such as 2.4 GHz, 5 GHz and other spectrum resources are extensively used for transmission. In a case that base stations and terminals are operated in unlicensed spectrums, as they need to work with other systems such as Wi-Fi, they are further required to follow the channel collision avoidance scheme of a Wi-Fi system, that is, the LBT (listen before talk) scheme.

In the unlicensed spectrums, after a terminal detects a transmission opportunity under the LBT scheme, it occupies the channel for a period according to a Maximum Channel Occupancy Time (MCOT) or a Channel Occupancy Time (COT) under the authorization of the base station.

For the unlicensed spectrum resources, the new mobile communication system further introduces a grant-free uplink (GUL, also referred to as Autonomous uplink, which is abbreviated as AUL) transmission scheme. Under the grant-free uplink transmission scheme, the base station is not required to schedule uplink resources for each uplink transmission of the terminal; instead, it schedules authorized uplink transmission resources for the terminal, that is, configuring a transmission period for available resources in the unlicensed spectrum, so that the terminal automatically performs uplink transmission through uplink transmission resources corresponding to the transmission period. In other words, grant-free uplink transmission is a transmission that does not require uplink scheduling every time.

However, the transmission resources in a wireless communication system are limited. If many UEs are scheduled for perform grant-free uplink transmission, massive uplink resources are reserved in the system, the UEs that are scheduled to perform grant-free uplink transmission do not always have uplink service information to be transmitted all the time, thus, a waste of resources is inevitable.

SUMMARY

In order to overcome problems in related technologies, embodiments of the present disclosure provide methods, base stations, and user equipment (UE) for transmitting information to effectively distinguish LBT detection priorities of various UEs in a case that the various UEs share unlicensed uplink resources, and reduce the probability of transmission collisions.

According to the first aspect of the embodiments of the present disclosure, there is provided a method of transmitting information, applicable to a base station, and including:
determining grant-free uplink transmission configuration information of at least two target UEs, the grant-free uplink transmission configuration information at least including LBT detection configuration information of each of the at least two target UEs, the LBT detection configuration information configured to distinguish respective LBT detection priorities of the at least two target UEs for channel collision avoidance, wherein the at least two target UEs share periodic uplink transmission resources in an unlicensed spectrum; and
transmitting, to each of the at least two target UEs, the grant-free uplink transmission configuration information, so that any one of the at least two target UEs performs an LBT detection according to the grant-free uplink transmission configuration information, and transmits uplink service data through a currently shared uplink transmission resource after the LBT detection succeeds.

In some embodiments of the present disclosure, before determining the grant-free uplink transmission configuration information of the at least two target UEs, the method further includes:
determining the at least two target UEs according to uplink transmission demand information of respective UEs within a preset time range.

In some embodiments of the present disclosure, determining the at least two target UEs according to the uplink transmission demand information of the respective UEs within the preset time range includes:
determining a total amount of uplink transmission demand of at least two participating UEs that are to share the periodic uplink transmission resources within the preset time range;
comparing the total amount of uplink transmission demand with an amount of periodic uplink transmission resources within the preset time range; and
in response to determining that the total amount of uplink transmission demand is not greater than the amount of periodic uplink transmission resources, the participating UEs that are to share the periodic uplink transmission resources are determined as the target UEs.

In some embodiments of the present disclosure, determining the grant-free uplink transmission configuration information of the at least two target UEs includes:
determining an LBT detection priority of each of the at least two target UEs; and
determining a corresponding LBT detection configuration information according to different LBT detection priorities of the at least two target UEs.

In some embodiments of the present disclosure, the LBT detection configuration information includes:
indication information of an LBT detection starting time of each of the at least two target UEs.

In some embodiments of the present disclosure, the LBT detection configuration information further comprises a preset clear channel assessment (CCA) measurement value.

In some embodiments of the present disclosure, the indication information of the LBT detection starting time includes any one of followings:
a detection starting time;
a preset time offset; and a preset time index value indicating the preset time index value of the detection starting time.

In some embodiments of the present disclosure, the LBT detection configuration information includes:
different CCA measurement values for respective target UEs, wherein the CCA measurement values are integers greater than or equal to zero.

In some embodiments of the present disclosure, the grant-free uplink transmission configuration information further includes extension indication information of the LBT detection window.

In some embodiments of the present disclosure, the grant-free uplink transmission configuration information further includes: adjustment information of the shared transmission resources, the adjustment information configured to instruct the at least two target UEs to expand a time-frequency range of each of the shared uplink transmission resources;
the method further includes: transmitting the adjustment information of the shared transmission resources to an associated UE, so that the associated UE adjusts its own transmission timing according to the adjustment information of the shared transmission resources, wherein the associated UE is a non-participating UE whose range of transmission resources is affected.

According to a second aspect of embodiments of the present disclosure, a method of transmitting information is provided, applicable to user equipment (UE), which is a participating UE that shares periodic uplink resources in an unlicensed spectrum, the method includes:
receiving, from a base station, a grant-free uplink transmission configuration at least comprising LBT detection configuration information of the UE for channel collision avoidance, the LBT detection configuration information configured to indicate an LBT detection priority configured by the base station for the UE;
determining LBT detection information of the UE according to the LBT detection configuration information; and
performing an LBT detection on periodic shared uplink transmission resources according to the LBT detection information, and performing information transmission according to a detection result.

In some embodiments of the present disclosure, the LBT detection configuration information of the UE includes indication information of the LBT detection starting time for the UE;
determining the LBT detection information for the terminal for channel collision avoidance according to the LBT detection configuration information includes:
determining an LBT detection starting time of the UE according to the indication information of the LBT detection starting time.

In some embodiments of the present disclosure, the indication information of the LBT detection starting time includes a preset time offset;
determining the LBT detection starting time of the UE according to the indication information of the LBT detection starting time includes:
determining the LBT detection starting time of the UE according to a starting time of the LBT detection window and the preset time offset.

In some embodiments of the present disclosure, the indication information of the LBT detection starting time comprises a preset time index value indicating the LBT detection starting time;
determining the LBT detection starting time of the UE according to the indication information of the LBT detection starting time includes:
determining an LBT detection starting time corresponding to the present time index value by looking up a preset detection time list according to the preset time index value, wherein the preset detection time list comprises a correspondence between a time index value and the preset LBT detection starting time.

In some embodiments of the present disclosure, performing the LBT detection on the periodic shared uplink transmission resources according to the LBT detection information includes:
generating a clear channel assessment (CCA) measurement random number;
starting an LBT detection in an LBT detection window of the shared uplink transmission resources in a case that the periodic shared uplink transmission resources arrive;
determining that the LBT detection succeeds in a case that the number of idle unit time-frequency resources detected in the LBT detection window reaches the CCA measurement random number;
determining that the LBT detection fails in a case that the number of idle unit time-frequency resources detected in the LBT detection window is less than the CCA measurement random number.

In some embodiments of the present disclosure, the LBT detection configuration information for the UE further includes: a preset clear channel assessment (CCA) measurement value;
performing the LBT detection on the periodic shared uplink transmission resources according to the LBT detection information includes:
starting the LBT detection in the LBT detection window of the shared uplink transmission resource according to the LBT detection starting time in a case that the periodic shared uplink transmission resources arrive;
determining that the LBT detection succeeds in a case that the number of idle unit time-frequency resources detected in the LBT detection window reaches the CCA measurement value; and
determining that the LBT detection fails in a case that the number of idle unit time-frequency resources detected in the LBT detection window is less than the CCA measurement value.

In some embodiments of the present disclosure, the LBT detection configuration information for the UE includes a preset clear channel assessment (CCA) measurement value for the UE;
performing the LBT detection on the periodic shared uplink transmission resources according to the LBT detection information includes:
performing an LBT detection at a starting time of the LBT detection window of the shared uplink transmission resources in a case that the periodic shared uplink transmission resources arrive;
determining that the LBT detection succeeds in a case that the number of idle unit time-frequency resources detected in the LBT detection window reaches the CCA measurement value; and
determining that the LBT detection fails in a case that the number of idle unit time-frequency resources detected in the LBT detection window is less than the CCA measurement value.

According to a third aspect of embodiments of the present disclosure, a device for transmitting information is provided, the device is applicable to a base station, and includes:
an information determining module, configured to determine grant-free uplink transmission configuration information for at least two target UEs, wherein the grant-free uplink transmission configuration information at least includes a LBT detection configuration information for each of the at least two target UEs, and the LBT detection configuration information is configured to distinguish a LBT detection priority of each of the at least two target UEs for channel collision avoidance; wherein the at least two target UEs share periodic uplink transmission resources in an unlicensed spectrum;

a transmitting module, configured to transmit, to each of the at least two target UEs, the grant-free uplink transmission configuration information, so that any one of the at least two target UEs performs LBT detection according to the grant-free uplink transmission configuration information, and transmits uplink service data through a currently shared uplink transmission resource after the LBT detection succeeds.

In some embodiments of the present disclosure, the device further includes:

a target UE determining module, configured to determine the at least two target UEs according to uplink transmission demand information of respective UEs.

In some embodiments of the present disclosure, the target UE determining module includes:

a transmission demand determining sub-module, configured to determine a total amount of uplink transmission demand of at least two participating UEs within the preset time range;

a comparing sub-module, configured to compare the total amount of uplink transmission demand with an amount of periodic uplink transmission resources within the preset time range; and a target UE determining sub-module, configured to determine the participating UEs as the target UEs in a case that the total amount of uplink transmission demand is not greater than the amount of periodic uplink transmission resources.

In some embodiments of the present disclosure, the information determining module includes:

a detection priority determining sub-module, configured to determine a LBT detection priority of each of the at least two target UEs; and an LBT configuration information determining sub-module, configured to determine a corresponding LBT detection configuration information according to the LBT detection priorities of respective target UEs.

In some embodiments of the present disclosure, the LBT detection configuration information includes:

indication information of different LBT detection starting times corresponding to the respective target UEs.

In some embodiments of the present disclosure, the LBT detection configuration information further includes a preset clear channel assessment (CCA) measurement value.

In some embodiments of the present disclosure, the indication information of the LBT detection starting time comprises any one of followings:

a detection starting time;

a preset time offset; and a preset time index value indicating the detection starting time.

In some embodiments of the present disclosure, the LBT detection configuration information includes:

different CCA measurement values for the respective target UEs, where the CCA measurement values are integers greater than or equal to zero.

In some embodiments of the present disclosure, the grant-free uplink transmission configuration information further includes extension indicating information of the LBT detection window.

In some embodiments of the present disclosure, the grant-free uplink transmission configuration information further includes: adjustment information of the shared transmission resources, and the adjustment information is configured to instruct the target UE to expand a time-frequency range of each of the shared uplink transmission resources;

the device further includes:

an adjustment information transmitting module, configured to transmit the adjustment information of the shared transmission resources to an associated UE, so that the associated UE adjusts its own transmission timing according to the adjustment information of the shared transmission resources, wherein the associated UE is a non-participating terminal whose range of transmission resources is affected.

According to a fourth aspect of embodiments of the present disclosure, a device for transmitting information, which is applicable to user equipment (UE), wherein the UE is a participating UE which shares periodic uplink transmission resources in an unlicensed spectrum with other UEs in an unlicensed spectrum, the device includes:

an information receiving module, configured to receive, from a base station, grant-free uplink transmission configuration information, wherein the grant-free uplink transmission configuration information at least comprises a LBT detection configuration information for the UE for channel collision avoidance, and the LBT detection configuration information is configured to indicate a LBT detection priority configured by the base station for the UE;

a detection information determining module, configured to determine an LBT detection information of the UE according to the LBT detection configuration information; and a transmitting module, configured to perform an LBT detection on periodic shared uplink transmission resources according to the LBT detection information, and to transmit information according to a detection result.

In some embodiments of the present disclosure, the LBT detection configuration information of the UE includes indication information of the LBT detection starting time for the UE; and the detection information determining module includes:

a starting time determining sub-module, configured to determine the LBT detection starting time of the UE according to the indication information of the LBT detection starting time.

In some embodiments of the present disclosure, the indication information of the LBT detection starting time includes a preset time offset; and the start time determining sub-module is configured to determine the LBT detection starting time of the UE according to a starting time of the LBT detection window and the preset time offset.

In some embodiments of the present disclosure, the indication information of the LBT detection starting time includes a preset time index value indicating the LBT detection starting time; and the start time determining sub-module is configured to determine the LBT detection starting time corresponding to the preset time index value by looking up a preset detection time list according to the preset time index value, wherein the preset detection time list comprises a correspondence between the time index value and the LBT detection starting time.

In some embodiments of the present disclosure, the transmitting module includes:
- a reference value generating sub-module, configured to generate a clear channel assessment (CCA) measurement random number;
- a first LBT detection sub-module, configured to start an LBT detection in the LBT detection window of the shared uplink transmission resources according to the LBT detection starting time in a case that the periodic shared uplink transmission resources arrive;
- a first detection success determining sub-module, configured to determine that the LBT detection succeeds in a case that the number of idle unit time-frequency resources detected in the LBT detection window reaches the CCA measurement random number; and
- a first detection failure determining sub-module, configured to determine that the LBT detection fails in a case that the number of idle unit time-frequency resources detected in the LBT detection window is less than the CCA measurement random number.

In some embodiments of the present disclosure, the LBT detection configuration information of the UE further comprises a preset clear channel assessment (CCA) measurement value;
the transmitting module includes:
- a second LBT detection sub-module, configured to start LBT detection in the LBT detection window of the shared uplink transmission resources according to the LBT detection starting time in a case that the periodic shared uplink transmission resources arrive;
- a second detection success determining sub-module, configured to determine that the LBT detection succeeds in a case that the number of idle unit time-frequency resources detected in the LBT detection window reaches the CCA measurement value; and
- a second detection failure determining sub-module, configured to determine that the LBT detection fails in a case that the number of idle unit time-frequency resources detected in the LBT detection window is less than the CCA measurement value.

In some embodiments of the present disclosure, wherein the LBT detection configuration information of the UE includes: a preset clear channel assessment (CCA) measurement value for the UE;
the transmitting module includes:
- a third LBT detection sub-module, configured to perform a detection at a starting time of the LBT detection window of the shared uplink transmission resources in a case that the periodic shared uplink transmission resources arrive;
- a third detection success determining sub-module, configured to determine the LBT detection succeeds in a case that the number of idle unit time-frequency resources detected in the LBT detection window reaches the CCA measurement value; and
- a third detection failure determining sub-module, configured to determine that the LBT detection fails in a case that the number of idle unit time-frequency resources detected in the LBT detection window is less than the CCA measurement value.

According to a fifth aspect of embodiments of the present disclosure, a non-transitory computer-readable storage medium having computer instructions stored thereon is provided, wherein in response to that the instructions are executed by a processor, operations of any one of the methods according to the first aspect are implemented.

According to a sixth aspect of embodiments of the present disclosure, a non-transitory computer-readable storage medium having computer instructions stored thereon is provided, wherein in response to that the instructions are executed by a processor, operations of any one of the methods according to the second aspect are implemented.

According to a seventh aspect of embodiments of the present disclosure, a base station is provided, including:
- a processor;
- memory, configured to store instructions executable by the processor;
- wherein, the processor is configured to:
  - determine grant-free uplink transmission configuration information of at least two target UEs, the grant-free uplink transmission configuration information at least comprises an LBT detection configuration information of each of the at least two target UEs, and the LBT detection configuration information is configured to distinguish respective LBT detection priorities of the at least two target UEs for channel collision avoidance, wherein the at least two target UEs share periodic uplink transmission resources in an unlicensed spectrum;
  - transmit, to each of the at least two target UEs, the grant-free uplink transmission configuration information, so that any one of the target UEs performs an LBT detection according to the grant-free uplink transmission configuration information, and transmits uplink service data through a currently shared uplink transmission resources after the LBT detection succeeds.

According to an eighth aspect of embodiments of the present disclosure, user equipment (UE) is provided, including:
- a processor;
- memory, configured to store instructions executable by the processor;
- wherein, the processor is configured to:
  - receive, from a base station, grant-free uplink transmission configuration information, where the grant-free uplink transmission configuration information at least includes LBT detection configuration information of the UE for channel collision avoidance, and the LBT detection configuration information indicates an LBT detection priority that the base station configures for the UE;
  - determine an LBT detection information of the UE according to the LBT detection configuration information; and
  - perform an LBT detection on periodic shared uplink transmission resources according to the LBT detection information, and transmit information according to a detection result.

The technical solutions according to the embodiments of the present disclosure may include the following beneficial effects:
Through the information transmission method provided by the present disclosure, in a case of determining the grant-free uplink transmission configuration information for a plurality of target UEs that share the same uplink transmission resources, the base station can designate different LBT detection priorities for respective target UEs, so that the target UE performs LBT detection in the LBT detection window of the shared uplink transmission resources according to the LBT detection priority designated by the base station, thereby effectively utilizing the shared uplink transmission resources, avoiding transmission collision events, and improving the reliability that a plurality of target UEs perform uplink transmission through the shared uplink transmission resources in an unlicensed spectrum.

It should be understood that the above general description and the following detailed description are only exemplary and explanatory, and cannot be construed as a limit to the present disclosure.

BRIEF DESCRIPTION OF THE DRAWINGS

The figures here are incorporated into the specification and constitute a part of the specification, illustrate embodiments in accordance with the present disclosure, and together with the specification are used to explain the principle of the present disclosure.

DETAILED DESCRIPTION

Figure 1:
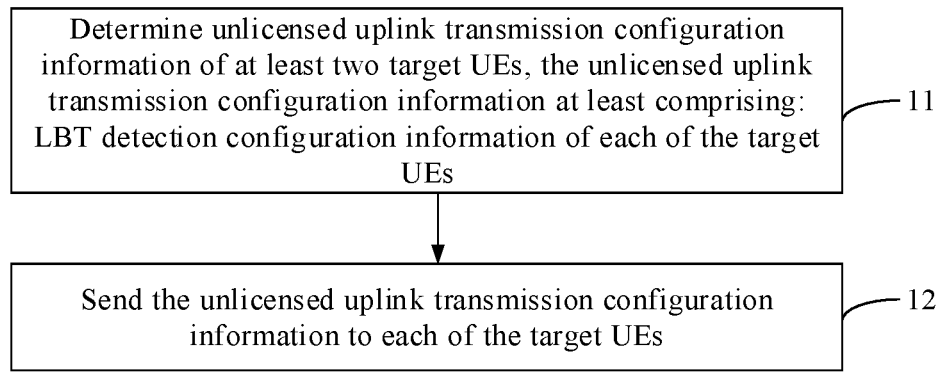
FIG. 1 is a flow chart illustrating a method of transmitting information according to an exemplary embodiment of the present disclosure.

The exemplary embodiments will be described in detail here, and examples thereof are illustrated in the accompanying figures. When the following description refers to the figures, unless otherwise indicated, the same reference numerals in different figures designate the same or similar elements. The implementation manners described in the following exemplary embodiments do not represent all implementation manners consistent with the present disclosure. On the contrary, they are merely examples of devices and methods consistent with some aspects of the present disclosure as defined in the appended claims.

Executive bodies involved in this disclosure include: base stations and user equipment (UE) in mobile communication networks such as 4G LTE (Long Term Evolution), LTE-NR interworking, 5G NR, etc. The base station may be a base station, a sub-base station, etc., provided with a large-scale antenna array. The user equipment may be a user terminal, a user node, a mobile terminal or a tablet computer, etc. In the specific implementation process, the base station and the user equipment are independent from each other, and at the same time they are connected to each other to jointly implement the technical solutions according to the present disclosure.

Before introducing the technical solution of the present disclosure, the LBT (listen before talk) scheme will be introduced first. The principle of the LBT scheme is: in case that an information transmitter is to transmit information through unlicensed spectrum resources, it first performs clear channel detection on the unlicensed spectrum, and in response to successfully detecting a transmission opportunity, it occupies a channel for a period of time for information transmission under the Maximum Channel Occupancy Time (MCOT) or Channel Occupancy Time (COT) agreed by the system.

In the present disclosure, User Equipment (UE) is required to perform clear channel detection through the LBT scheme before transmitting uplink data through unlicensed spectrum resources.

Based on this, the present disclosure provides a method of transmitting information. Referring to FIG. 1, which illustrates a flowchart of a method of transmitting information according to an exemplary embodiment of the present disclosure, the method may be applicable to a base station, and the method may include:

In step 11, unlicensed uplink transmission configuration information of at least two target UEs are determined, the unlicensed uplink transmission configuration information at least includes: LBT detection configuration information of each of the at least two target UEs, the LBT detection configuration information is configured to distinguish LBT detection priorities for respective target UEs for channel collision avoidance; wherein the at least two target UEs share periodic uplink transmission resources in an unlicensed spectrum.

In related technologies, grant-free uplink transmission refers to that the base station configures periodic uplink transmission resources for a UE in an unlicensed spectrum, so that the UE may automatically perform uplink information transmission through the periodic uplink transmission resources configured by the base station on the unlicensed spectrum within a period. That is, in the grant-free uplink transmission mode, in a case of performing uplink information transmission through unlicensed spectrum resources, the UE is not required to receive an uplink scheduling signaling issued by the base station before each uplink transmission and to perform uplink according to the uplink scheduling signaling.

The application scenario of the present disclosure is: for an uplink transmission period of an unlicensed spectrum, in order to avoid resource waste due to a large number of uplink resources reserved, the base station configures uplink transmission resources in the grant-free uplink transmission period for at least two target UEs. That is, the base station configures the same grant-free periodic uplink transmission resources for the at least two target UEs.

It is assumed that the at least two target UEs comprise three target UEs, namely: UE1, UE2, and UE3. In the above application scenario, for the shared uplink transmission resources in a transmission period, in a case that the three UEs are to perform uplink information transmission, that is, there is a transmission collision; then a target UE that is the first to succeed in LBT detection may occupy currently shared uplink transmission resources, a UE that fails in LBT detection needs to detect other shared uplink transmission resources again according to agreement.

However, in a case that each of the at least two target UEs performs LBT detection, since respective target UEs start LBT detection at the same time, it may occur that two or three target UEs all succeed in the LBT detection as transmission status of other target UEs may not be detected, according to a principle that transmission starts after successful detection, at least two target UEs that succeed in LBT detection transmit uplink information to the base station through same time-frequency resources at the same time, that is, transmission collision occurs, such that the base station fails to obtain respective information of the at least two UEs and uplink transmission of related UEs fails.

In view of potential transmission collision in a case that various target UEs use grant-free shared uplink transmission resources, in the present disclosure, the grant-free uplink transmission configuration information configured for respective target UEs by the base station at least includes LBT detection configuration information. The LBT detection configuration information is configured to distinguish respective LBT detection priorities of the at least two target UEs, so as to instruct each target UE to perform LBT detection on a time-frequency resource of a same unlicensed spectrum according to different LBT detection priorities.

In the present disclosure, according to whether a plurality of target UEs that share periodic uplink transmission resources in an unlicensed spectrum are determined before the base station configures the uplink transmission configuration information, implementation of the step 11 may include following two cases:

In the first case, before implementing the step 11, the base station has determined a plurality of target UEs that share periodic uplink transmission resources in the unlicensed spectrum, and has informed each of the plurality of target UEs of the transmission configuration information of the periodic uplink transmission resources shared by the plurality of target UEs. In a case of determining grant-free uplink transmission configuration information for the at least two target UEs, the base station only needs to determine the BLT detection configuration information.

That is, in the first case, the step 11 includes: determining LBT detection configuration information for each of the at least two target UEs.

In the second case, before implementing the step 11, the base station has not determined a plurality of target UEs that share periodic uplink transmission resources in the unlicensed spectrum.

Figure 2:
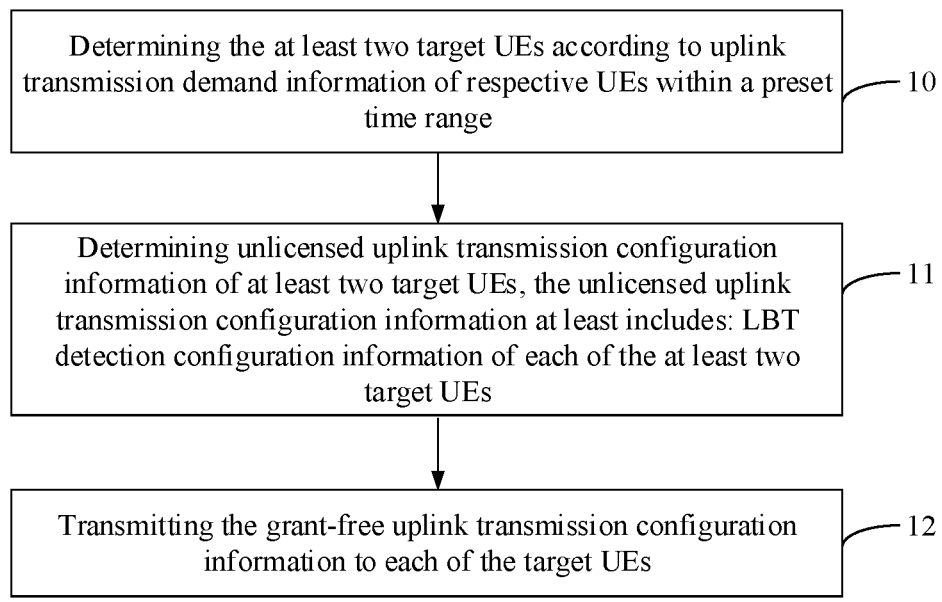
FIG. 2 is a flowchart illustrating a method of transmitting information according to another exemplary embodiment of the present disclosure.

Referring to FIG. 2 which illustrates a flowchart of a method of transmitting information according to another exemplary embodiment of the present disclosure, before the step 11, the method may further include:

In step 10, the at least two target UEs are determined according to uplink transmission demand information of respective UEs within a preset time range.

In the present disclosure, the base station may determine which UEs may share periodic uplink transmission resources of an unlicensed spectrum according to a preset strategy.

In an embodiment of the present disclosure, the base station may determine a plurality of target UEs that share periodic uplink transmission resources according to an amount of uplink data to be transmitted by respective UEs in a period.

Figure 3:
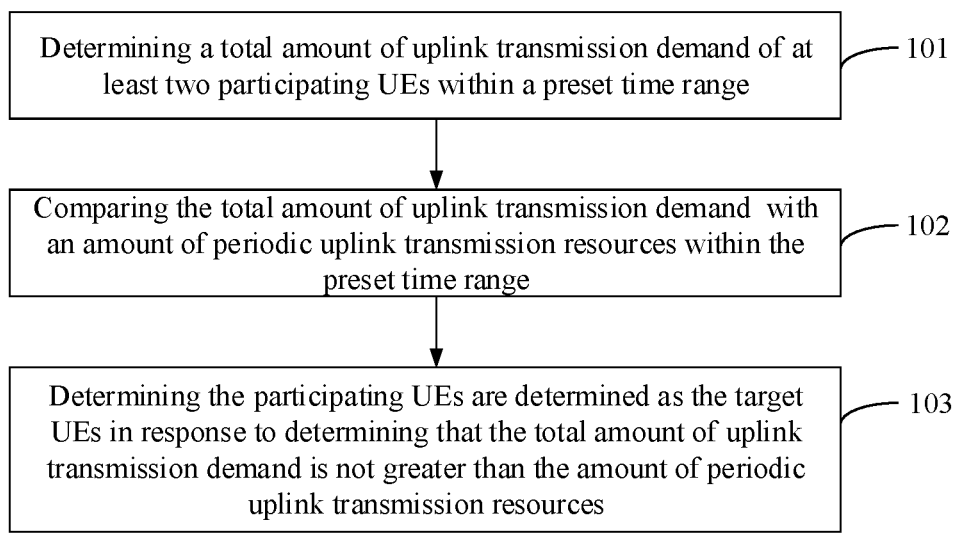
FIG. 3 is a flowchart illustrating a method of transmitting information according to an exemplary embodiment of the present disclosure.

Referring to FIG. 3, which illustrates a flowchart of a method of transmitting information according to another exemplary embodiment of the present disclosure, the step 10 may include:

In step 101, a total amount of uplink transmission demand of at least two participating UEs within a preset time range are determined;

The participating UEs refer to UEs that have uplink service transmission within a preset time range and may detect through LBT detection that other UE among the UEs is transmitting information.

In this disclosure, the base station may determine, according to related arts, such as uplink buffer status report (BSR) transmitted by the participating UEs, amount of uplink data to be transmitted by each of the participating UEs in a preset time range, and calculate a sum of the amount of uplink data to be transmitted by each of the participating UEs, so as to obtain a total amount of uplink transmission demand of the at least two participating UEs.

In step 102, the total amount of uplink transmission demand is compared with an amount of periodic uplink transmission resources within the preset time range.

Taking three participating UEs as an example, assuming that the base station counts the total amount of the uplink transmission of respective participating UEs in a preset time range, such as 10 ms, and determines that the total amount of the uplink transmission is C uplink transmission, wherein an amount of transmission resources occupied by each uplink transmission is may be defined by the system in advance.

In the present disclosure, the amount of periodic uplink transmission resources configured within a preset time range, such as 10 ms, may be expressed as: M shared uplink transmission resources.

Then the base station can compare M with C, and determine according to a preset strategy whether the participating UEs can share the uplink transmission resources in an unlicensed uplink transmission period.

In step 103, in response to determining that the total amount of uplink transmission demand is not greater than the amount of periodic uplink transmission resources, the participating UEs are determined as the target UEs.

In an embodiment of the present disclosure, in response to that the base station determines that C is less than or equal to M, the three participating UEs are determined as three target UEs.

In another embodiment of the present disclosure, in response to determining that C is greater than M, the base station may also configure the three participating UEs as three target UEs in a case that a competition scheme is established, which is not limited in the present disclosure.

Regarding the second case, in a case that the base station determines unlicensed uplink transmission configuration information for a plurality of target UEs, the base station may first configure same uplink transmission configuration information for each of the target UEs. The uplink transmission configuration information, configured to inform each of the target UEs that it can share Uplink transmission resources that arrive periodically in the unlicensed spectrum. The uplink transmission configuration information may include: a period T of a grant-free time-frequency resource in the unlicensed spectrum, an offset indicating a starting position of the period, a time-frequency position of a shared uplink transmission resource in a transmission period, and Modulation and Coding Scheme (MCS) and other information. After that, the base station determines LBT detection configuration information of each target UE.

Figure 4:
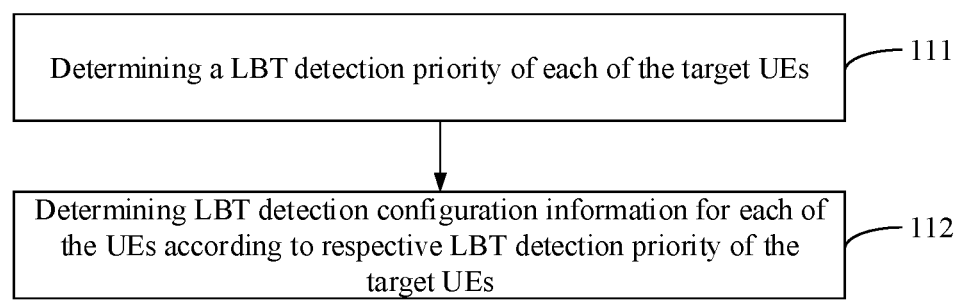
FIG. 4 is a flow chart illustrating a method of transmitting information according to another exemplary embodiment of the present disclosure.

In any one of the foregoing cases, for how the base station determines the LBT detection configuration information for at least two target UEs, please refer to a flowchart of a method of transmitting information illustrated in FIG. 4 according to an exemplary embodiment of the present disclosure. The foregoing step 11 may include:

In step 111, a LBT detection priority of each of the target UEs is determined.

In the present disclosure, the base station can determine different LBT detection priorities of respective target UEs, so that a target UE with a relatively high priority has a relatively great probability of successfully detecting an uplink transmission opportunity. In a case that a plurality of target UEs are required to detect available uplink transmission resources under an LBT scheme, the target UE with a relatively high priority may preempt a currently shared uplink transmission resource, such that it may have a priority to complete uplink service transmission.

The base station may determine an LBT detection priority for each of the target UEs according to at least one piece of attribute information, such as a device type of each of the target UEs, a service type of the uplink service to be transmitted, and the like.

For example, that the base station determines the LBT detection priorities for three target UEs according to the device types of the three target UEs is taken as an example. It is assumed that UE1 is an Ultra Reliable Low Latency Communication (URLLC) device; UE2 is an enhanced Mobile Broad Band (eMBB) device; and UE3 is a massive Machine Type Communication (mMTC) device. Because the above-mentioned devices have different requirements on delay sensitivity, the order of delay sensitivity from high to low is as follows: the URLLC device, the eMBB device, and the mMTC device, the LBT detection priority of each of the target UEs may be determined as a first level, a second level, and a third level, according to the requirements of the above-mentioned devices on the delay sensitivity, wherein the first level is the highest priority. A correspondence between the LBT detection priorities and the device information of each of the target UEs may be as illustrated in Table 1:

TABLE 1

| Equipment Identity | Equipment type | LBT detection priority |
|---|---|---|
| UE1 | URLLC | First Level |
| UE2 | eMBB | Second Level |
| UE3 | mMTC | Third Level |

In step 112, LBT detection configuration information is determined for each of the UEs according to respective LBT detection priority of the target UEs.

In the present disclosure, in a case that the base station determines the LBT detection configuration information according to the respective LBT detection priority of the target UEs, it configures from at least two dimensions: a detection starting time and an LBT detection window. Correspondingly, an expression manner of the LBT detection configuration information may be any one of the followings manners:

Manner I: The LBT detection configuration information includes: indication information of respective LBT detection starting times of the target UEs.

As still in the above example, for an LBT detection window of the same uplink transmission opportunity, the base station may configure the earliest LBT detection starting time for the target UE with the highest LBT priority, and configures a detecting starting time that is later than the earliest detection starting time for the target UE with a relatively lower priority. Corresponding to the above Table 1, respective detection starting times configured by the base station for the target UEs may be as illustrated in Table 2:

TABLE 2

| Equipment Identity | LBT Detection Priority | Detection Starting Time |
|---|---|---|
| UE1 | First Level | T1 |
| UE2 | Second Level | T2 |
| UE3 | Third Level | T3 |

Figure 5A:
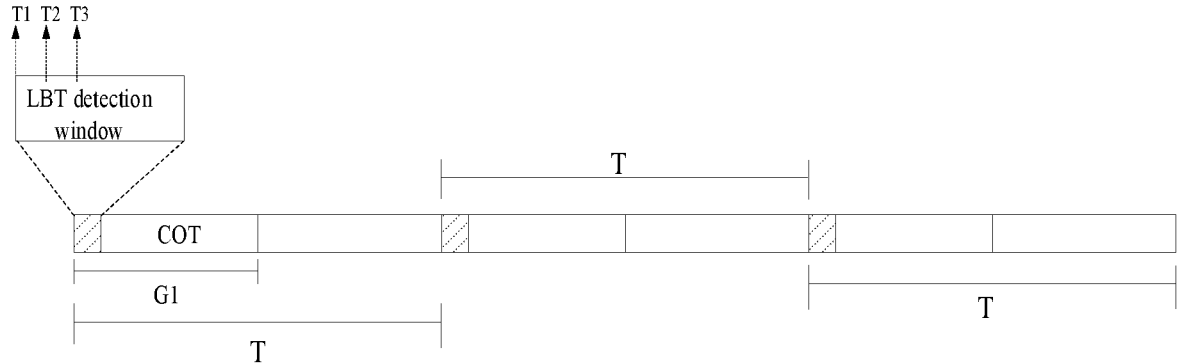
FIG. 5A is a first schematic diagrams diagram illustrating application scenarios of transmitting information according to an exemplary embodiment of the present disclosure.

T1, T2, and T3 represent the respective detection starting time of the target UEs in the LBT detection window, where T3>T2>T1. The positions of the respective detection starting times in the LBT detection window may be as illustrated in FIG. 5A, T represents an unlicensed uplink transmission period; G1 represents a shared uplink transmission resource in the transmission period T.

Correspondingly, the indication information of the respective detection starting times in the LBT detection configuration information may be a specific detection starting time, such as the different detection starting times illustrated in the Table 2.

In another embodiment of the present disclosure, the indication information of the respective detection starting time may be a preset time offset, instead.

Wherein, in an embodiment of the present disclosure, in a case that the base station configures that intervals between detection starting times of every two adjacent target UEs are same, the preset time offset may indicate a time offset between adjacent detection starting times, for example, 10 μs.

In another embodiment of the present disclosure, alternatively, the preset time offset may indicate a time offset from a starting time of the LBT detection window to an LBT detection time, for example, the preset time offset for the UE1 is set to 0 μs; the preset time offset for the UE2 is set to 10 μs; the preset time offset for the UE3 is set to 20 μs. In this case, the time intervals between two adjacent detection starting times configured by the base station may be same or different, and the configuration is more flexible.

In an embodiment of the present disclosure, in a case that respective preset detection starting times are pre-configured for the priorities in the system, the indication information of the respective detection starting time in the LBT detection configuration information may further be expressed as: respective time index values for the respective preset detection starting times.

For example, supposing that 4 levels are defined for the LBT detection priorities of the target UEs, and both the detection starting time and the time index value for each level are predefined, as illustrated in Table 3:

TABLE 3

| LBT Detection Priority | Initial Detection Time | Preset Time Index Value |
|---|---|---|
| First level | T01 | 1 |
| Second Level | T02 | 2 |
| Third Level | T03 | 3 |
| Fourth Level | T04 | 4 |

Then the target time index values corresponding to Table 1 can be as illustrated in Table 4:

TABLE 4

| Device Identity | LBT Detection Priority | Target Time Index Value |
|---|---|---|
| UE1 | First level | 1 |
| UE2 | Second Level | 2 |
| UE3 | Third Level | 3 |

Then, the indication information of respective detection starting times of the LBT detection configuration information may be the target time index value corresponding to each target UE illustrated in Table 4, namely 1, 2, and 3. The base station may use 2 bits to indicate the target time index value in a case of issuing the LBT detection configuration information, thereby reducing signaling overhead.

Corresponding to the above situations, in a case that the target UE such as UE1 detects the indication information of the detection starting time configured by the base station, such as the time index value 1, a preset table such as Table 3 may be looked up to determine the LBT detection starting time configured by the base station, i.e., T01.

In summary, in the present disclosure, the base station may use any of the above-mentioned methods to indicate the LBT detection starting time, and forms of indicating the LBT detection starting time are not limited in the present disclosure.

It can be seen from the above-mentioned various embodiments of manner I that the base station configures different LBT detection starting times for different target UEs, and triggers a plurality of target UEs to start LBT detection at different times, which can effectively avoid uplink transmission collision, thereby ensuring reliability that the plurality of targets UEs transmit uplink information with the shared uplink transmission resources in the unlicensed spectrum.

Manner II: In addition to the indication information of different LBT detection starting times for the respective target UEs, the LBT detection configuration information configured by the base station for the respective target UEs further includes: a preset clear channel assessment (CCA) measurement value.

Regarding the LBT detection, in a wireless communication system, before a device is required to transmit data on a certain channel, it first monitors data transmission and reception of other devices on the channel. In a case that a given time has passed, no other devices are found to be transmitting data on this channel, it starts to transmit data; and in a case that it is found that other devices are transmitting data on this channel, it will retry the process again after a period of random duration. This method can effectively avoid collision on a wireless channel.

Regarding how the detecting party judges the successful detection of a clear channel, in related technologies, a device that initiates an LBT detection, such as a UE that is required to transmit data, will randomly generate a Clear Channel Assessment (CCA) measurement value N before detecting a clear channel in the unlicensed spectrum. In a case that the number of idle time-frequency resources detected by the UE within a given time period, that is, within the LBT detection window, is greater than or equal to N, it is determined according to a preset rules that current channel is idle in a preset time range, that is, it is determined that a CTO window may be a transmission interval, and data may be transmitted within the COT window.

For the above manner I, in some cases, the base station configures different LBT detection starting time for the respective target UEs, however, as the CCA measurement values generated by the respective target UEs in a case of performing an LBT detection are random values generated by the respective target UEs on their own, a transmission collision event may still occur in a case that a CCA measurement value generated by a target UE whose detection starting time is later, such as the UE2, is less than a CCA measurement value generated by a target UE whose detection starting time is early, such as the UE1.

In view of this, in order to more clearly distinguish the LBT detection priorities of the respective target UEs, in the embodiments of the present disclosure, the base station may instead configure a fixed CCA measurement value for each of the target UEs. Compared with the manner I, occurrence of transmission collision events can be completely avoided.

In the manner II, in a case that the base station determines detection starting times for respective target UEs, it is required to only distinguish time sequences of the respective target UEs, and there is no need to further calculate whether a time interval between two adjacent starting times is sufficient to avoid transmission collisions. The configuration process is simple and calculation amount is small.

Figure 5B:
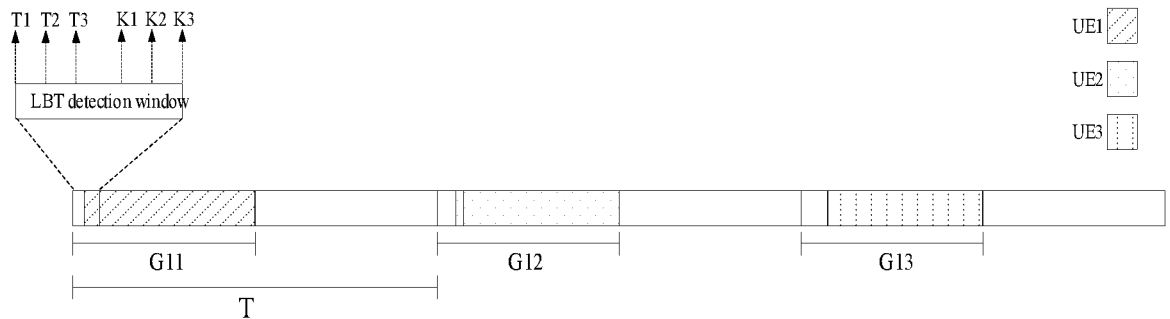
FIG. 5B is a second schematic diagram illustrating application scenarios of transmitting information according to an exemplary embodiment of the present disclosure.

In this configuration manner, corresponding to the Table 2, in a case that LBT detection starting times configured currently by a base station for UE1, UE2, and UE3 are respectively T1, T2, and T3, and CCA measurement values configured for the respective UEs are the same, it may be predicted that transmission starting times of the respective UEs are respectively K1, K2, and K3 in a case of no resource competition, and a schematic view of transmission is illustrated in FIG. 5B.

Figure 5C:
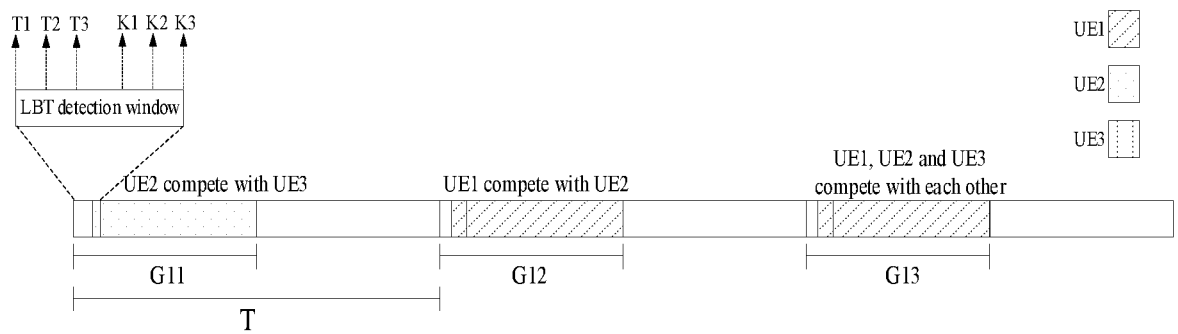
FIG. 5C is a third schematic diagram illustrating application scenarios of transmitting information according to an exemplary embodiment of the present disclosure.

In a case that there is a transmission collision between the respective target UEs, LBT detection results of the respective target UEs in this manner can be seen in the schematic view of transmission information illustrated in FIG. 5C. As illustrated in FIG. 5C, in a case that both UE2 and UE3 have data to be transmitted on a first shared uplink transmission resource G11 in a first grant-free uplink transmission period T, according to the LBT detection scheme, UE2 with a relatively high detection priority preempts the first shared uplink transmission resource G11 and starts uplink data transmission on the first shared uplink transmission resource G11. Similarly, in a case that both UE1 and UE2 have data to be transmitted on the second shared uplink transmission resource G12 in the second grant-free uplink transmission period T, according to the LBT detection scheme, UE1 with a relatively high detection priority preempts the second shared uplink transmission resource G12 and start uplink data transmission on the shared uplink transmission resource G12. Based on the same analogue, in a case that UE1, UE2, and UE3 all have data to be transmitted on the third shared uplink transmission resource G13 in the third grant-free uplink transmission period T, according to the LBT detection scheme, UE1 with the highest detection priority preempts the third shared uplink transmission resource G13 and starts uplink data transmission on the shared uplink transmission resource G13.

Manner III: The LBT detection configuration information determined by the base station for the respective target UEs includes: different CCA measurement values for the respective target UEs.

In another embodiment of the present disclosure, in a case of configuring the LBT detection configuration information for the respective target UEs, the base station may further configure different CCA measurement values for the respective target UEs to effectively distinguish the LBT detection priorities of the respective target UEs.

Exemplarily, corresponding to the Table 1, the base station may configure a relatively small CCA measurement value for UE1, such as 1, and correspondingly, configure a CCA measurement value with increased values for UE2 and UE3, respectively Supposing that the CCA measurement values configured by the base station for UE1, UE2, and UE3 are: N1=1; N2=3; N3=5, a correspondence between the LBT detection priorities of the respective target UEs and the CCA measurement value N can be illustrated in Table V.

TABLE V

| Equipment Identity | LBT Detection Priority | CCA Measure Value N |
|---|---|---|
| UE1 | First Level | 1 |
| UE2 | Second Level | 3 |
| UE3 | Third Level | 5 |

In the embodiment of the present disclosure, the CCA measurement values N configured by the base station for the respective target UEs may be an integer greater than or equal to zero.

Correspondingly, the respective target UEs can start detection at the same time in the LBT detection window. As the CCA measurement values N for accessing clear channel are different, for example, a target UE with the highest priority, such as UE1, is provided with a smallest CCA measurement value, so the target UE with the highest priority will be the first to succeed in LBT detection, thereby preempting a currently shared uplink transmission resource and starting data transmission, and other target UEs avoid the current transmission opportunity and perform LBT detection again in a case that a next shared uplink transmission resource arrives so as to win a transmission opportunity.

In another embodiment of the present disclosure, in order to adapt to adjustment of the LBT detection priorities of the respective target UEs as described above, the base station may extend a time domain length of the LBT detection window based on shared uplink transmission resources that are initially configured, for example, extending the LBT detection window in the case of the manner I and the manner II.

Correspondingly, corresponding to the first case, that is, the base station has informed each of the target UEs in advance of the configuration information of respective shared uplink transmission resources in a transmission period, the grant-free uplink transmission configuration information configured by the base station includes the LBT detection configuration information and further includes extension indicating information of the LBT detection window.

In the present disclosure, the base station may extend the LBT detection window in the following two manners, which will be described in detail below with reference to FIGS. 6A to 6D.

In the first manner, only the LBT detection window in one shared uplink transmission resource is extended, and a time-frequency range of initially shared uplink transmission resource does not change.

Figure 6A:
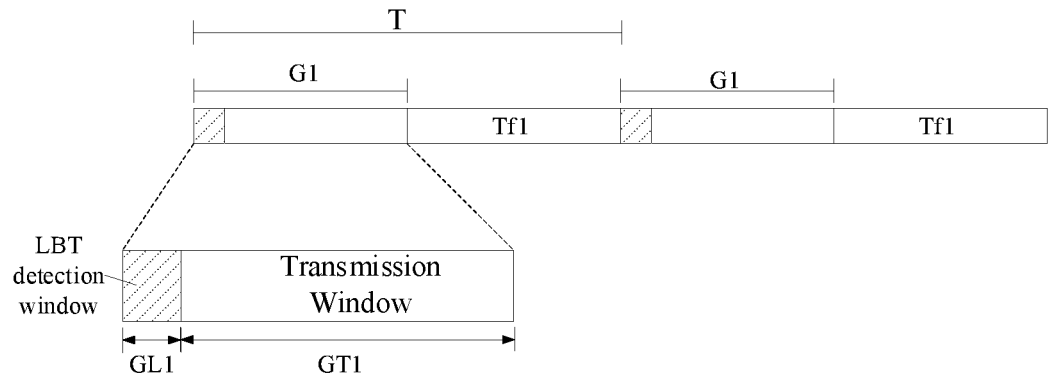
FIG. 6A is a first schematic diagrams diagram illustrating application scenarios of transmitting information according to an exemplary embodiment of the present disclosure.

Referring to the schematic structural view of periodic uplink transmission resources as illustrated in FIG. 6A, time-frequency resources of two consecutive grant-free uplink transmission periods T are taken as an example for illustration, wherein each of the grant-free uplink transmission period T includes a shared uplink transmission resource G1 and a non-shared uplink transmission resource Tf1, and the shared uplink transmission resource G1 includes: an LBT detection window GL1 and a transmission window GT1.

It is assumed that, in shared uplink transmission resource G1 originally configured by the base station for three target UEs, a length of an original LBT detection window GL1 is 32 μs, and a length of an original shared uplink transmission resource G1 is 2 ms.

Figure 6B:
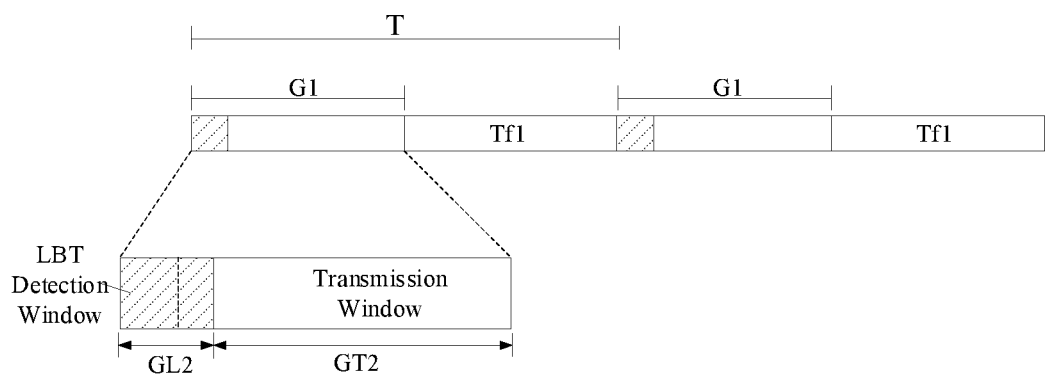
FIG. 6B is a second schematic diagram illustrating application scenarios of transmitting information according to an exemplary embodiment of the present disclosure.

Please refer to FIG. 6B, illustrating a schematic structural view of another periodic uplink transmission resource according to an exemplary embodiment of the present disclosure. In this embodiment, a total duration of a grant-free uplink transmission period T remains unchanged, and a time-frequency range of shared uplink transmission resource G1 in the transmission period is not changed, but the base station has configured a longer LBT detection window, namely GL2, for the three participating target UEs, for example, GL2 is extended to 50 μs. Correspondingly, the transmission window in a shared uplink transmission resource G1, that is, the COT area, will be adaptively shortened, that is, a length of the transmission window GT2 is shortened by 18 μs with respect to GT1 in FIG. 6A.

In this case, the extension indicating information of the LBT detection window is configured to inform the respective target UEs of the duration of the updated LBT detection window.

In the first manner, as the time-frequency range of the shared uplink transmission resource G1 has not changed, extending the LBT detection window can not only satisfy target UEs with different detection priorities for LBT detection, but also will not affect other UEs to use the non-shared transmission resource Tf1 for information transmission.

In the second manner, the LBT detection window in a shared uplink transmission resource is extended, and the transmission window is unchanged, thereby expanding the time-frequency range of the shared uplink transmission resource in a grant-free uplink transmission period.

Figure 6C:
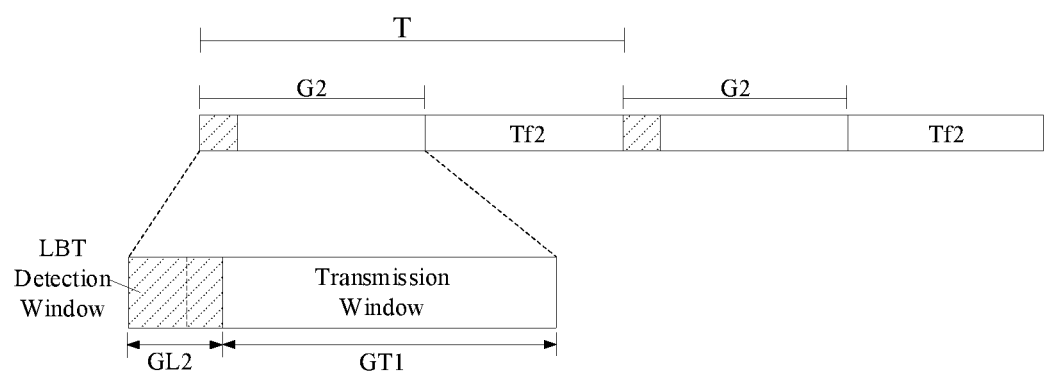
FIG. 6C is a third schematic diagram illustrating application scenarios of transmitting information according to an exemplary embodiment of the present disclosure.

Please refer to FIG. 6C illustrating a schematic structure view of a periodic uplink transmission resource according to an exemplary embodiment of the present disclosure, for a shared uplink transmission resource in a grant-free uplink transmission period T, a length of the LBT detection window is extended on a basis that the transmission window GT1 is not changed, such that the time-frequency range of the shared uplink transmission resource is expanded from G1 to G2.

Correspondingly, since the time-frequency range of the grant-free uplink transmission period T remains unchanged, the time-frequency range of the unshared transmission resources in the transmission period T will be reduced from Tf1 to Tf2.

In response to the changes, the grant-free uplink transmission configuration information configured by the base station includes: extension indicating information of the LBT detection window, and further includes: adjustment information of the shared transmission resource, wherein the adjustment information is configured to instruct the target UE to expand time-frequency range of each shared uplink transmission resource.

Figure 6D:
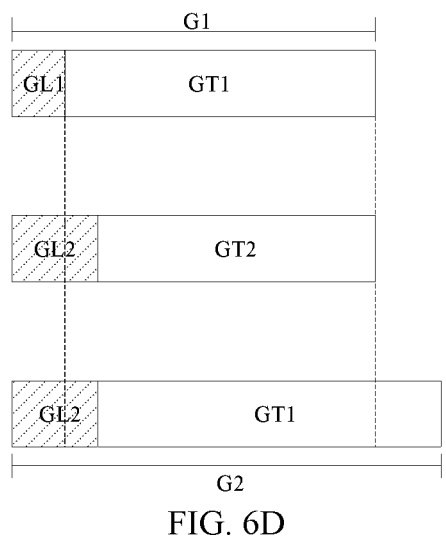
FIG. 6D is a fourth schematic diagram illustrating application scenarios of transmitting information according to an exemplary embodiment of the present disclosure.

FIG. 6D illustrates changes of the time-frequency range of the shared uplink transmission resource in a grant-free uplink transmission period T of the first extension mode and the second extension mode with respect to the initial setting, respectively.

In step 12, the grant-free uplink transmission configuration information is transmitted to each of the target UEs, so that any one of the target UEs performs an LBT detection according to the grant-free uplink transmission configuration information, and transmits uplink service data through a currently shared uplink transmission resource in a case of successful detection.

In the present disclosure, in the above embodiments, the base station may transmit the grant-free uplink transmission configuration information to each of the target UEs through an upper layer signaling or a physical layer signaling, wherein the upper layer signaling may be a Radio Resource Control (RRC) signaling, a Medium Access Control (MAC) signaling, or a Control Element (CE) signaling.

Figure 7:
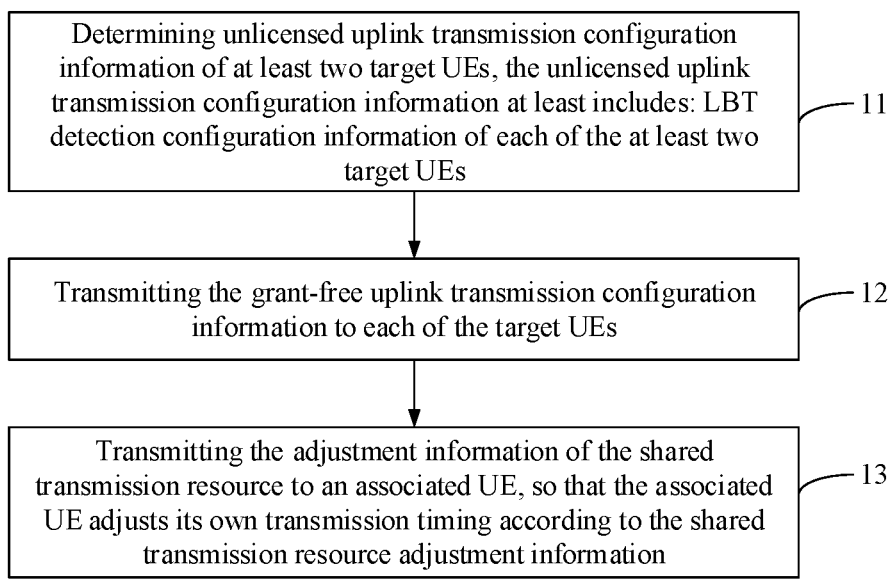
FIG. 7 is a flowchart illustrating a method of transmitting information according to another exemplary embodiment of the present disclosure.

Correspondingly, the grant-free uplink transmission configuration information further includes: adjustment information of the shared transmission resources. Referring to FIG. 7, which illustrates a flowchart of a method of transmitting information according to another exemplary embodiment of the present disclosure, the method may further include:

In step 13, the adjustment information of the shared transmission resource is transmitted to an associated UE, so that the associated UE adjusts its own transmission timing according to the shared transmission resource adjustment information, wherein the associated UE is a non-participating UE whose range of transmission resource is affected.

Referring to FIG. 6C, since the time-frequency range of each shared uplink transmission resource G2 has changed, a time-frequency range of unshared uplink transmission resource in a grant-free uplink transmission period T has also changed accordingly. Therefore, the base station is required to inform the associated UE of such change. For example, the base station planned to schedule unshared uplink transmission resource Tf1 to UE4 for uplink information transmission, and now, as a time-frequency range of the unshared uplink transmission resource is reduced to Tf2, the base station is required to inform the UE4 of the adjustment information in time, such that the UE4 may start uplink information transmission on a new time-frequency position.

In the same way, the base station may transmit the adjustment information of the shared transmission resource to the associated UE through an upper layer signaling, such as an RRC signaling or a physical layer signaling.

In summary, through the method of transmitting information according to the present disclosure, the base station can indicate different LBT detection priorities for the respective target UEs in a case of determining grant-free uplink transmission configuration information for the plurality of target UEs which share the same uplink transmission resource, such that the plurality of target UEs perform LBT detection in an LBT detection window of the shared uplink transmission resource according to the LBT detection priorities indicated by the base station. Thus, the shared uplink transmission resource may be utilized effectively, and transmission collision events may be avoided, thereby improving reliability that the plurality of target UEs perform uplink information transmission through the shared transmission resource in the unlicensed spectrum.

Correspondingly, the present disclosure further provides a method of transmitting information, which is applicable to UE. The UE may be a participating UE configured by a base station to share a grant-free periodic uplink transmission resource, that is, a target UE as described above.

Figure 8:
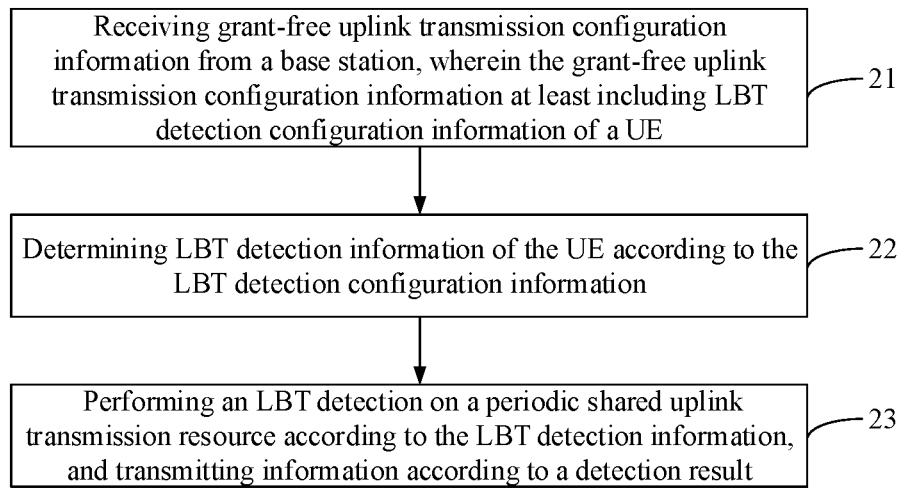
FIG. 8 is a flow chart illustrating a method of transmitting information according to an exemplary embodiment of the present disclosure.

Referring to FIG. 8, which illustrates a flowchart of a method of transmitting information according to an exemplary embodiment, the method may include:

In step 21, grant-free uplink transmission configuration information is received from a base station, wherein the grant-free uplink transmission configuration information at least includes LBT detection configuration information of a UE, and the LBT detection configuration information is configured to indicate a LBT detection priority that is configured by the base station for the terminal;

Wherein, the LBT detection configuration information may include at least one of indication information for the LBT detection starting time of the UE and a preset clear channel assessment (CCA) measurement value.

In step 22, LBT detection information of the UE is determined according to the LBT detection configuration information;

Corresponding to the information included in the LBT detection configuration information, the LBT detection information includes at least one of an LBT detection starting time and a preset CCA measurement value. The LBT detection starting time indicates a time that the UE start to detect periodic uplink transmission resources in an unlicensed spectrum under an LBT scheme.

Determining the LBT detection starting time may include the following manners based on the forms of the indication information of the LBT detection starting time of the UE.

Manner I: In a case that the indication information of the LBT detection starting time is specific starting time information, the specific starting time information is directly determined as the LBT detection starting time.

Manner II: In a case that the indication information of the LBT detection starting time is a preset time offset, the UE determines its own LBT detection starting time according to a starting time of the LBT detection window determined in advance and the preset time offset.

Manner III: In a case that the indication information of the LBT detection starting time is a preset time index value indicating the detection starting time, the step 22 may include:
  determining the LBT detection starting time corresponding to the preset time index value by looking up a preset detection time list according to the preset time index value, wherein the preset detection time list includes a correspondence between a time index value and the LBT detection starting time.

Exemplarily, the preset detection time list may be as illustrated in the foregoing Table 3. Assuming that a current UE is UE1, and the UE1 receives indication information of the detection starting time that is configured by the base station for it and the indication information is an index value 1, the UE1 may look up the Table 3 and determine that the LBT detection starting time that the base station configures for it is T01.

In step 23, an LBT detection is performed on a periodic shared uplink transmission resource according to the LBT detection information, information is transmitted according to a detection result.

As described above, the LBT detection information determined in the step 22 includes at least one of the LBT detection starting time and the preset CCA measurement value.

Correspondingly, according to different LBT detection signals, in the step 23, performing an LBT detection on a periodic shared uplink transmission resource according to the LBT detection information according to the LBT detection information may include the following three implementation manners:

Implementation I, the LBT detection information includes a LBT detection starting time.

Figure 9:
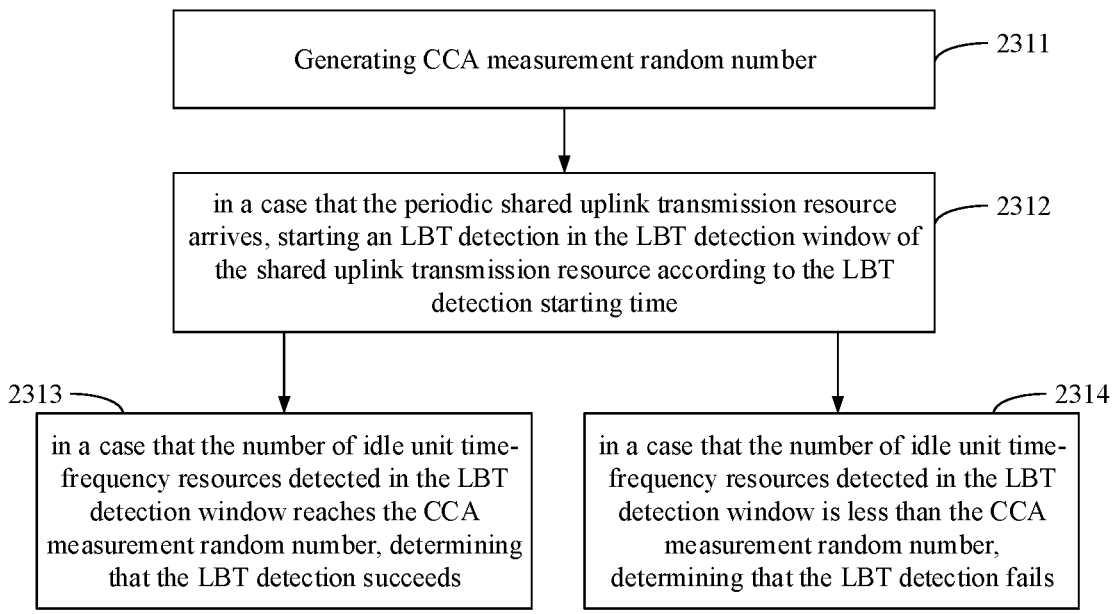
FIG. 9 is a flowchart illustrating a method of transmitting information according to another exemplary embodiment of the present disclosure.

Referring to FIG. 9, which illustrates a flowchart of a method of transmitting information according to an exemplary embodiment of the present disclosure, the foregoing step 23 may include:
  In step 2311, a clear channel assessment (CCA) measurement random number is generated;
  In the embodiment of the present disclosure, in a case of starting LBT detection, the UE generates a CCA measurement value, i.e., a CCA measurement random number N. The CCA measurement random number may be an integer greater than or equal to 0, and its value range may be defined by the system, such as [0, 32].
  In step 2312, in a case that the periodic shared uplink transmission resource arrives, an LBT detection is started in the LBT detection window of the shared uplink transmission resource according to the LBT detection starting time.
  In step 2313, in a case that the number of idle unit time-frequency resources detected in the LBT detection window reaches the CCA measurement random number, it is determined that the LBT detection succeeds;
  In step 2314, in a case that the number of idle unit time-frequency resources detected in the LBT detection window is less than the CCA measurement random number, it is determined that the LBT detection fails.

Exemplarily, suppose that a current UE is UE2, and a CCA measurement random number generated by the UE2 is 2. As illustrated in FIG. 5A, in a case that a shared uplink transmission resource G1 arrives, the UE2 starts LBT detection at time T2 in the LBT detection window. In a case that the number of idle unit time-frequency resources detected by the UE2 in the LBT detection window reaches 2, it is determined that the LBT detection succeeds, and the UE2 may preempt a currently shared uplink transmission resource for uplink information transmission.

Conversely, in a case that the number of idle unit time-frequency resources detected by the UE2 in the LBT detection window does not reach 2, and the reason is that UE1 with higher LBT detection priority has successfully detected and started data transmission, the UE2 determines that LBT detection fails, and do not transmit information through the currently shared uplink transmission resource.

Implementation II, the LBT detection information includes: an LBT detection starting time and a preset clear channel assessment (CCA) measurement value.

Figure 10:
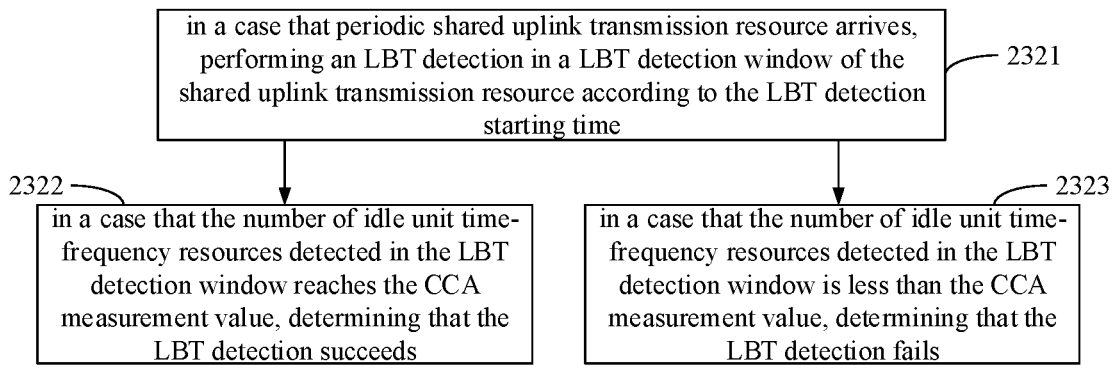
FIG. 10 is a flowchart illustrating a method of transmitting information according to another exemplary embodiment of the present disclosure.

Referring to FIG. 10, which illustrates a flowchart of a method of transmitting information according to another exemplary embodiment of the present disclosure, the step 23 may include:
  In step 2321, in a case that periodic shared uplink transmission resource arrives, an LBT detection is performed in a LBT detection window of the shared uplink transmission resource according to the LBT detection starting time;
  In step 2322, in a case that the number of idle unit time-frequency resources detected in the LBT detection window reaches the CCA measurement value, it is determined that the LBT detection succeeds;
  In step 2323, in a case that the number of idle unit time-frequency resources detected in the LBT detection window is less than the CCA measurement value, it is determined that the LBT detection fails.

The difference between Implementation I and Implementation II is that the preset CCA measurement value is configured by the base station for the current UE, and the preset CCA measurement value is the same as the CCA measurement value configured by the base station for other shared UEs. In a case that there are two or more than two UEs compete for a shared uplink transmission resource, as the detection starting times thereof are different, it can be more effectively ensured that a UE with a higher LBT detection priority may succeed in the LBT detection, and preempt the shared uplink transmission resource.

Implementation III: The LBT detection information includes a preset clear channel assessment (CCA) measurement value.

Figure 11:
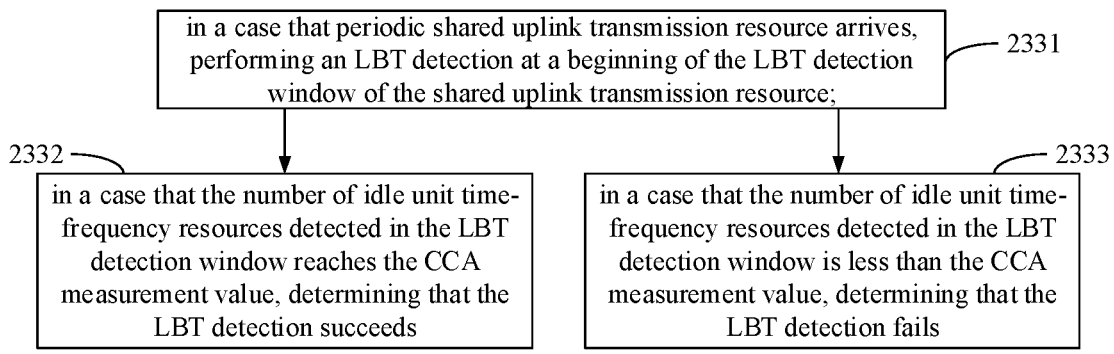
FIG. 11 is a flowchart illustrating a method of transmitting information according to another exemplary embodiment of the present disclosure.

Referring to FIG. 11, which illustrates a flowchart of a method of transmitting information according to another exemplary embodiment of the present disclosure, the foregoing step 23 may include:

In step 2331, in a case that periodic shared uplink transmission resource arrives, an LBT detection is performed at a beginning of the LBT detection window of the shared uplink transmission resource;

In step 2332, in a case that the number of idle unit time-frequency resources detected in the LBT detection window reaches the CCA measurement value, it is determined that the LBT detection succeeds;

In step 2333, in a case that the number of idle unit time-frequency resources detected in the LBT detection window is less than the CCA measurement value, it is determined that the LBT detection fails.

The implementations of the present disclosure correspond to the situations in which the above-mentioned base station configures different CCA measurement values for each of the target UEs. For a current UE such as UE2, assuming that the CCA measurement value configured by the base station is 3, the UE2 starts an LBT detection at the beginning of the LBT detection window in a case that a periodic uplink transmission resource arrives. In a case that 3 idle unit time-frequency resources can be detected, it is determined that LBT detection succeeds. Otherwise, in a case that less than 3 idle unit time-frequency resources are detected, it is determined that the LBT detection fails. The reason for that the LBT detection fails is that, UE1, which is configured with a smaller CCA measurement value, first detects an idle unit time-frequency resource of the preset CCA measurement value, and preempts the currently shared uplink transmission resource.

For the implementations, for the sake of simple description, they are all expressed as a combination of a series of action, but one of ordinary skill in the art should know that the present disclosure is not limited by the described sequence of actions, because according to the present disclosure, some steps can be performed in other order or simultaneously.

Secondly, one of ordinary skill in the art should further know that the embodiments described in the specification are optional embodiments, and the involved actions and modules are not necessarily required by the present disclosure.

Corresponding to the foregoing embodiments of methods implementing application functions, the present disclosure further provides embodiments of devices for implementing the application functions and corresponding UEs.

Figure 12:
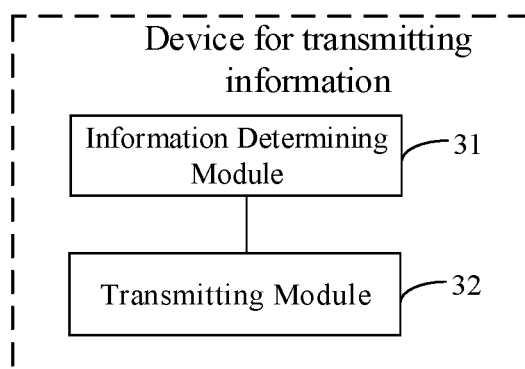
FIG. 12 is a block diagram illustrating a device for transmitting information according to an exemplary embodiment of the present disclosure.

Referring to FIG. 12, which illustrates a block diagram of a device for transmitting information is illustrated according to an exemplary embodiment, which is applicable to a base station, the device may include:

an information determining module 31, configured to determine grant-free uplink transmission configuration information of at least two target UEs, the grant-free uplink transmission configuration information at least includes LBT detection configuration information for each of the at least two target UEs, and the LBT detection configuration information is configured to distinguish respective LBT detection priorities of the at least two target UEs for channel collision avoidance; wherein the at least two target UEs shares a periodic uplink transmission resource in an unlicensed spectrum; and a transmitting module 32, configured to transmit the grant-free uplink transmission configuration information to each of the target UEs, so that any one of the target UEs performs an LBT detection according to the grant-free uplink transmission configuration information, and transmits uplink service data through a currently shared uplink transmission resource after the LBT detection succeeds.

Figure 13:
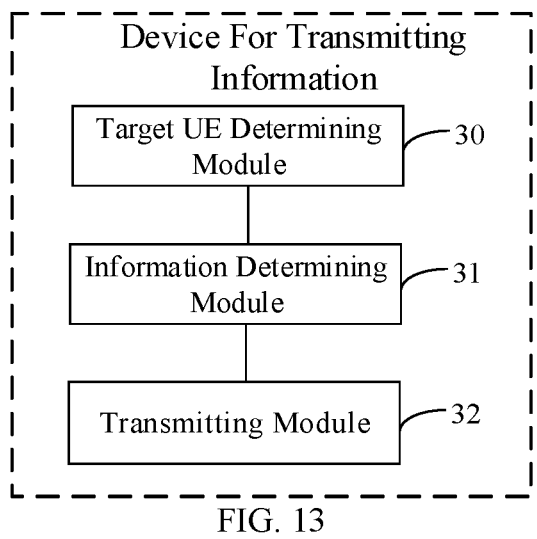
FIG. 13 is a block diagram illustrating a device for transmitting information according to another exemplary embodiment of the present disclosure.

Referring to FIG. 13 which illustrates a block diagram of a device for transmitting information according to another exemplary embodiment of the present disclosure, on the basis of the device embodiment as illustrated in FIG. 12, the device may further include:

a target UE determining module 30, configured to determine the at least two target UEs according to uplink transmission demand information of the respective UEs within a preset time range.

Figure 14:
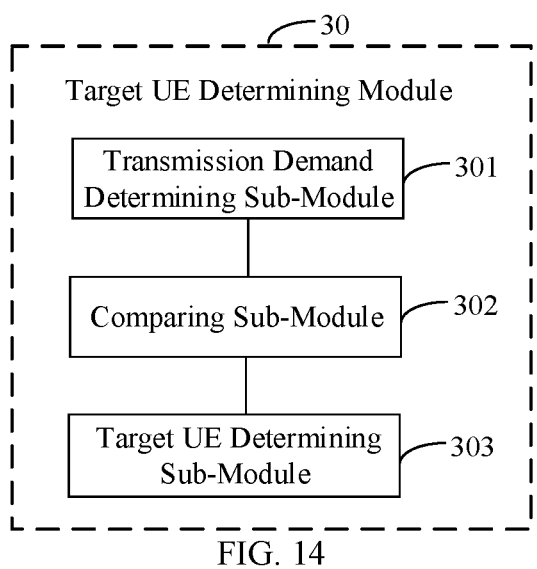
FIG. 14 is a block diagram illustrating a device for transmitting information according to another exemplary embodiment of the present disclosure.

Referring to FIG. 14 which illustrates a block diagram of a device for transmitting information according to another exemplary embodiment of the present disclosure, on the basis of the device embodiment as illustrated in FIG. 13, the target UE determining module 30 may include:

a transmission demand determining sub-module 301, configured to determine a total amount of uplink transmission demand of at least two participating UEs within the preset time range;

a comparing sub-module 302, configured to compare the total amount of uplink transmission demand with an amount of periodic uplink transmission resource within the preset time window; and a target UE determining sub-module 303, configured to determine the participating UEs as the target UEs in a case that the total amount of uplink transmission demand is not greater than the amount of periodic uplink transmission resources.

Figure 15:
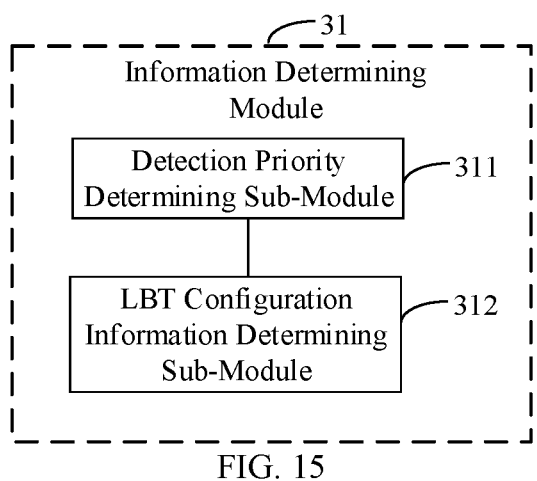
FIG. 15 is a block diagram illustrating a device for transmitting information according to another exemplary embodiment of the present disclosure.

Referring to FIG. 15 which illustrates a block diagram of a device for transmitting information according to another exemplary embodiment of the present disclosure, on the basis of the device embodiment as illustrated in FIG. 12, the information determining module 31 may include:

a detection priority determining sub-module 311, configured to determine LBT detection priorities of respective target UEs; and an LBT configuration information determining sub-module 312, configured to determine a corresponding LBT detection configuration information according to different LBT detection priorities of the respective target UEs.

In a device embodiment of the present disclosure, the LBT detection configuration information determined by the LBT configuration information determining sub-module 312 may include: different indication information of LBT detection starting times corresponding to the respective target UEs. In the present disclosure, the indication information of the LBT detection starting time may include any one of the following:

a detection starting time;

a preset time offset; and a preset time index value indicating the detection starting time.

In a device according to an embodiment of the present disclosure, the LBT detection configuration information determined by the LBT configuration information determining sub-module 312 may further include: a preset clear channel assessment (CCA) measurement value. The preset CCA measurement value may be a CCA measurement value for all target UEs defined by the system.

In a device according to another embodiment of the present disclosure, the LBT detection configuration information determined by the LBT configuration information determining sub-module 312 may include:

different CCA measurement values for the respective target UEs, wherein the CCA measurement values are integers greater than or equal to zero.

In a device according to another embodiment of the present disclosure, the grant-free uplink transmission configuration information determined by the information determining module 31 may further include: extension indicating information of the LBT detection window.

Figure 16:
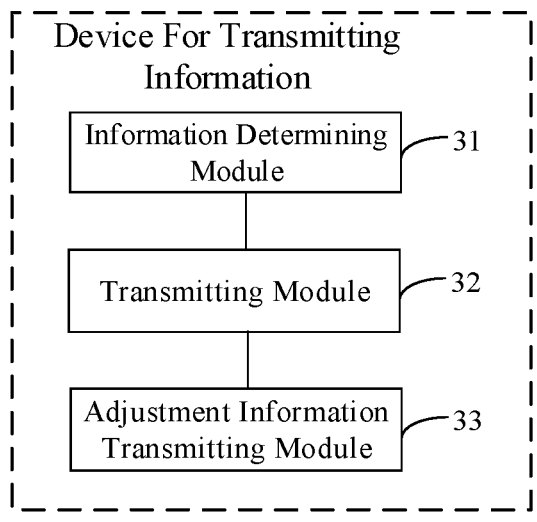
FIG. 16 is a block diagram illustrating a device for transmitting information according to another exemplary embodiment of the present disclosure.

In a device according to another embodiment of the present disclosure, the grant-free uplink transmission configuration information determined by the information determining module 31 may further include adjustment information of the shared transmission resource, the adjustment information is configured to instruct the target UEs to expand a time-frequency range of each of the shared uplink transmission resources. Correspondingly, referring to FIG. 16, which illustrates a block diagram of a device for transmitting information according to an exemplary embodiment of the present disclosure, on the basis of the device embodiment as illustrated in FIG. 12, the device may further include:

an adjustment information transmitting module 33, configured to transmit the adjustment information of the shared transmission resources to an associated UE, so that the associated UE adjusts its own transmission timing according to the adjustment information of the shared transmission resources, and the associated UE is a non-participating terminal whose range of transmission resources is affected.

Correspondingly, the present disclosure further provides a device for transmit information, which is applicable to a UE, which is a participating UE that shares periodic uplink transmission resources in an unlicensed spectrum with other UEs.

Figure 17:
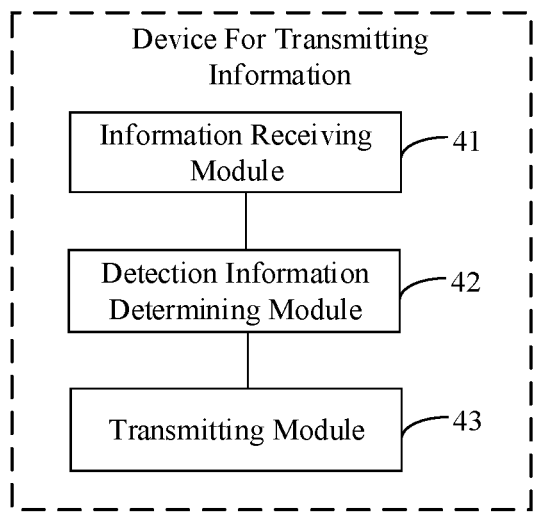
FIG. 17 is a block diagram illustrating a device for transmitting information according to an exemplary embodiment of the present disclosure.

Referring to FIG. 17, which illustrates a block diagram of a device for transmitting information according to an exemplary embodiment of the present disclosure, the device may include:

an information receiving module 41, configured to receive, from a base station, grant-free uplink transmission configuration information, wherein the grant-free uplink transmission configuration information at least includes LBT detection configuration information of the UE for channel collision avoidance, and the LBT detection configuration information is configured to indicate an LBT detection priority configured by the base station for the UE;

a detection information determining module 42, configured to determine a LBT detection information of the UE according to the LBT detection configuration information; and a transmitting module 43, configured to perform LBT detection on the periodic shared uplink transmission resources according to the LBT detection information, and perform information transmission according to a detection result.

In a device according to an embodiment of the present disclosure, the LBT detection configuration information of the UE received by the information receiving module 41 may include: indication information of the LBT detection starting time for the UE.

Figure 18:
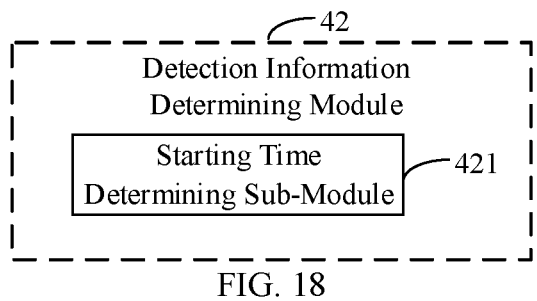
FIG. 18 is a block diagram illustrating a device for transmitting information according to another exemplary embodiment of the present disclosure.

Correspondingly, referring to FIG. 18, which illustrates a block diagram of a device for transmitting information according to another exemplary embodiment of the present disclosure, on the basis of the device embodiment as illustrated in FIG. 17, the detection information determining module 42 may include:

a starting time determining sub-module 421, configured to determine the LBT detection starting time of the UE according to the indication information of the LBT detection starting time.

In a device according to an embodiment of the present disclosure, the indication information of the LBT detection starting time may include a preset time offset;

and correspondingly, the start time determining sub-module 421 may be configured to determine an LBT detection starting time of the UE according to a starting time of the LBT detection window and the preset time offset.

In a device according to another embodiment of the present disclosure, the indication information of the LBT detection starting time may include a preset time index value indicating the LBT detection starting time;

and correspondingly, the start time determining sub-module 421 may be configured to look up a preset detection time list according to the preset time index value, and determine the LBT detection starting time corresponding to the preset time index value, wherein the preset detection time list includes a correspondence between a time index value and a preset LBT detection starting time.

Figure 19:
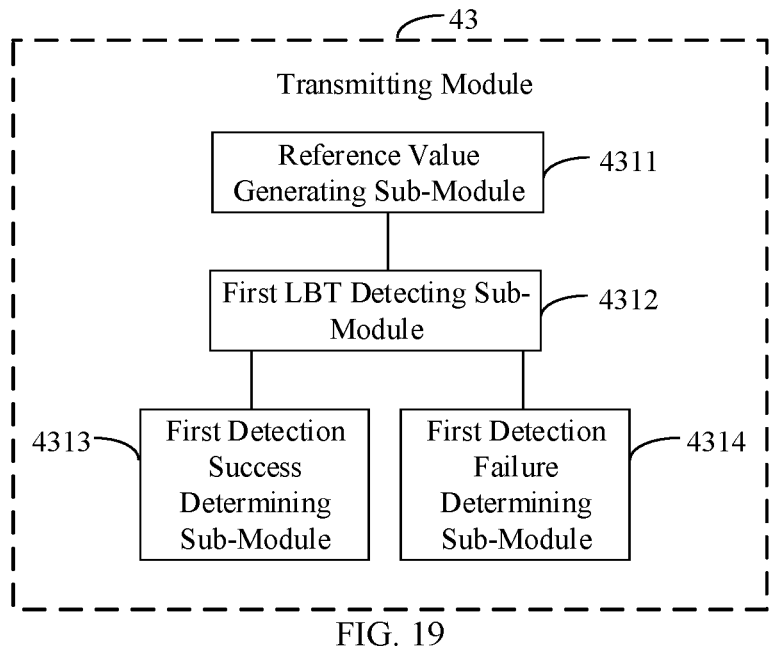
FIG. 19 is a block diagram illustrating a device for transmitting information according to another exemplary embodiment of the present disclosure.

Referring to FIG. 19, which illustrates a block diagram of a device for transmitting information according to another exemplary embodiment of the present disclosure. Based on the device embodiment as illustrated in FIG. 18, the transmitting module 43 may include:

a reference value generating sub-module 4311, configured to generate a clear channel assessment (CCA) measurement random number;

a first LBT detecting sub-module 4312, configured to perform an LBT detection in a LBT detection window of the shared uplink transmission resources according to the LBT detection starting time in a case that periodic shared uplink transmission resources arrive;

a first detection success determining sub-module 4313, configured to determine that the LBT detection succeeds in a case that the number of idle unit time-frequency resources detected in the LBT detection window reaches the CCA measurement random number; and a first detection failure determining sub-module 4314, configured to determine that the LBT detection fails in a case that the number of idle unit time-frequency resources detected in the LBT detection window is less than the CCA measurement random number.

In a device according to another embodiment of the present disclosure, the LBT detection configuration information of the UE received by the information receiving module 41 not only includes indication information of the LBT detection starting time for the UE; it may further include: a preset clear channel assessment (CCA) measurement value.

Figure 20:
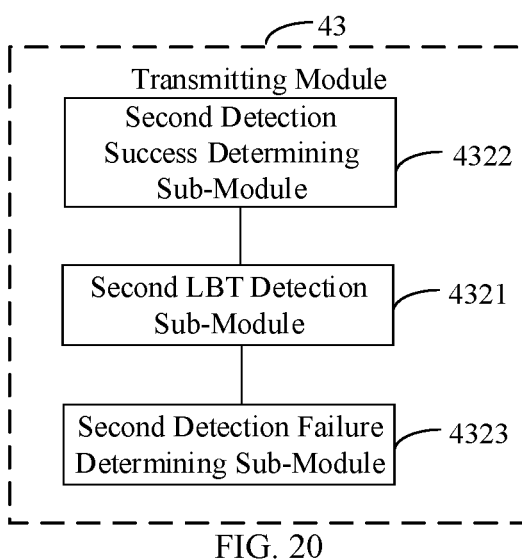
FIG. 20 is a block diagram illustrating a device for transmitting information according to another exemplary embodiment of the present disclosure.

Correspondingly, referring to FIG. 20, which illustrates a block diagram of a device for transmitting information according to another exemplary embodiment of the present disclosure, on the basis of the device embodiment as illustrated in FIG. 18, the transmitting module 43 may include:

a second LBT detection sub-module 4321, configured to start an LBT detection in the LBT detection window of the shared uplink transmission resources according to the LBT detection starting time in a case that the periodic shared uplink transmission resources arrive;

a second detection success determining sub-module 4322, configured to determine that the LBT detection succeeds in a case that the number of idle unit time-frequency resources detected in the LBT detection window reaches the CCA measurement value; and a second detection failure determining sub-module 4323, configured to determine that the LBT detection fails in a case that the number of idle unit time-frequency resources detected in the LBT detection window is less than the CCA measurement value.

In a device according to another embodiment of the present disclosure, the LBT detection configuration information of the UE received by the information receiving module 41 may include a preset clear channel assessment (CCA) measurement value for the UE.

Figure 21:
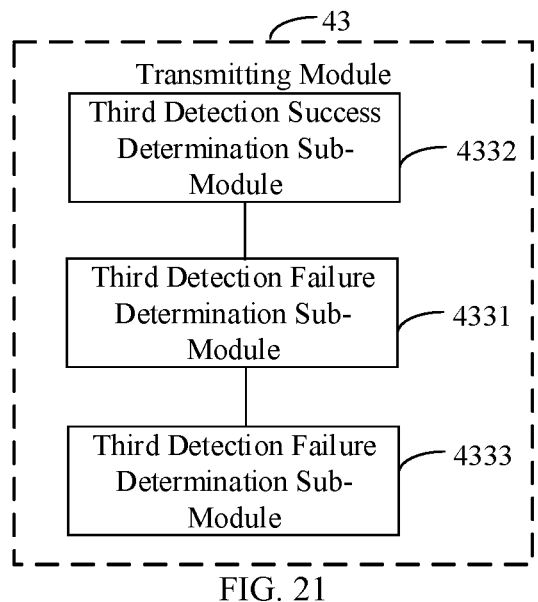
FIG. 21 is a block diagram illustrating a device for transmitting information according to another exemplary embodiment of the present disclosure.

Correspondingly, referring to FIG. 21, which illustrates the block diagram of a device for transmitting information according to another exemplary embodiment of the present disclosure, on the basis of the device embodiment as illustrated in FIG. 17, the transmitting module 43 may include:

a third LBT detection sub-module 4331, configured to perform detection at a starting of the LBT detection window of the shared uplink transmission resources in a case of the periodic shared uplink transmission resources arrive;

a third detection success determination sub-module 4332, configured to determine that the LBT detection succeeds in a case that the number of idle unit time-frequency resources detected in the LBT detection window reaches the CCA measurement value;

a third detection failure determination sub-module 4333, configured to determine that the LBT detection fails in a case that the number of idle unit time-frequency resources detected in the LBT detection window is less than the CCA measurement value.

As for the device embodiment, since it substantially corresponds to the method embodiments, the relevant part can refer to the part of the description of the method embodiments. The device embodiments described above are merely illustrative. The units described above as separate components may or may not be physically separated, and the components displayed as units may or may not be physical units, that is, they may be located at one place, or it can be distributed on a plurality of network units. Some or all of the modules can be selected according to actual requirements to achieve the objectives of the solutions of the present disclosure. One of ordinary skill in the art can understand and implement the present disclosure without creative work.

Correspondingly, on one hand, a base station is provided, including:

a processor;

memory, configured to store executable instructions executable by the processor;

wherein, the processor is configured to: determine grant-free uplink transmission configuration information of at least two target UEs, the grant-free uplink transmission configuration information at least includes LBT detection configuration information of each of the at least two target UEs, the LBT detection configuration information is configured to distinguish respective LBT detection priorities of the at least two target UEs for channel collision avoidance, wherein the at least two target UEs shares periodic uplink transmission resources in an unlicensed spectrum;

transmit the grant-free uplink transmission configuration information to each of the target UEs, so that any one of the at least two target UEs performs an LBT detection according to the grant-free uplink transmission configuration information, and transmits uplink service data through a currently shared uplink transmission resource after the LBT detection succeeds.

On the other hand, a terminal is provided, including:

a processor;

memory, configured to store instructions executable by the processor;

wherein, the processor is configured to:

receive, from a base station, grant-free uplink transmission configuration information, the grant-free uplink transmission configuration information at least includes LBT detection configuration information of the UE for channel collision avoidance, the LBT detection configuration information is configured to indicate a LBT detection priority configured by the base station for the UE;

determine a LBT detection information of the UE according to the LBT detection configuration information; an perform an LBT detection on periodic shared uplink transmission resources according to the LBT detection information; and perform information transmission according to a detection result.

Figure 22:
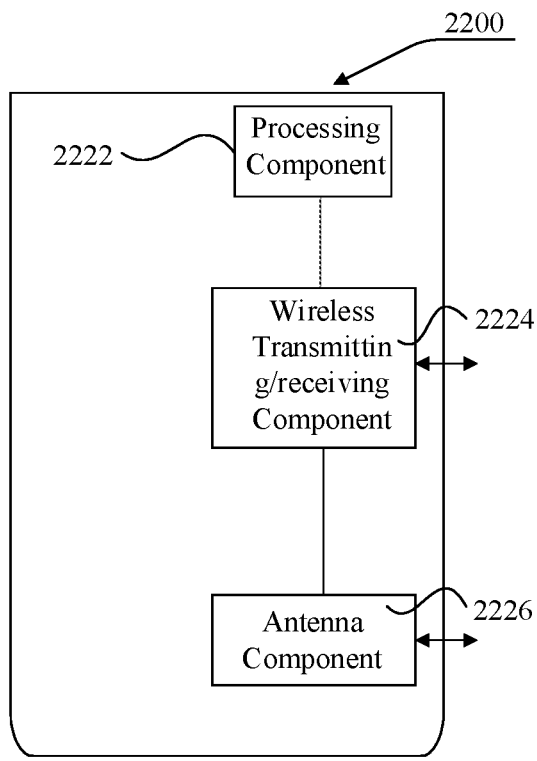
FIG. 22 is a schematic structural diagram illustrating a base station according to an exemplary embodiment of the present disclosure.

FIG. 22 illustrates a schematic structural diagram of a base station 2200 according to an exemplary embodiment of the present disclosure. Referring to FIG. 22, the base station 2200 includes a processing component 2222, a wireless transmitting/receiving component 2224, an antenna component 2226, and a signal processing part specific to a wireless interface. The processing component 2222 may further include one or more processors.

One processor of the processing component 2222 may be configured to:

determine grant-free uplink transmission configuration information of at least two target UEs, the grant-free uplink transmission configuration information at least includes LBT detection configuration information of each of the at least two target UEs, and the LBT detection configuration information is configured to distinguish LBT detection priorities of the respective target UEs for channel collision avoidance, wherein the at least two target UEs shares periodic uplink transmission resources in an unlicensed spectrum; and transmit the grant-free uplink transmission configuration information to each of the at least two target UEs, so that any one of the at least two target UEs performs an LBT detection according to the grant-free uplink transmission configuration information, and transmit uplink service data through a currently shared uplink transmission resource after the LBT detection succeeds.

In an exemplary embodiment of the present disclosure, a non-transitory computer-readable storage medium is provided, including computer instructions stored thereon. The computer instructions may be executed by the processing component 2222 of the base station 2200 to implement operations of the method of transmitting information as illustrated in FIGS. 1-7. For example, the non-transitory computer-readable storage medium may be ROM, random access memory (RAM), CD-ROM, magnetic tape, floppy disk, optical data storage device, etc.

Figure 23:
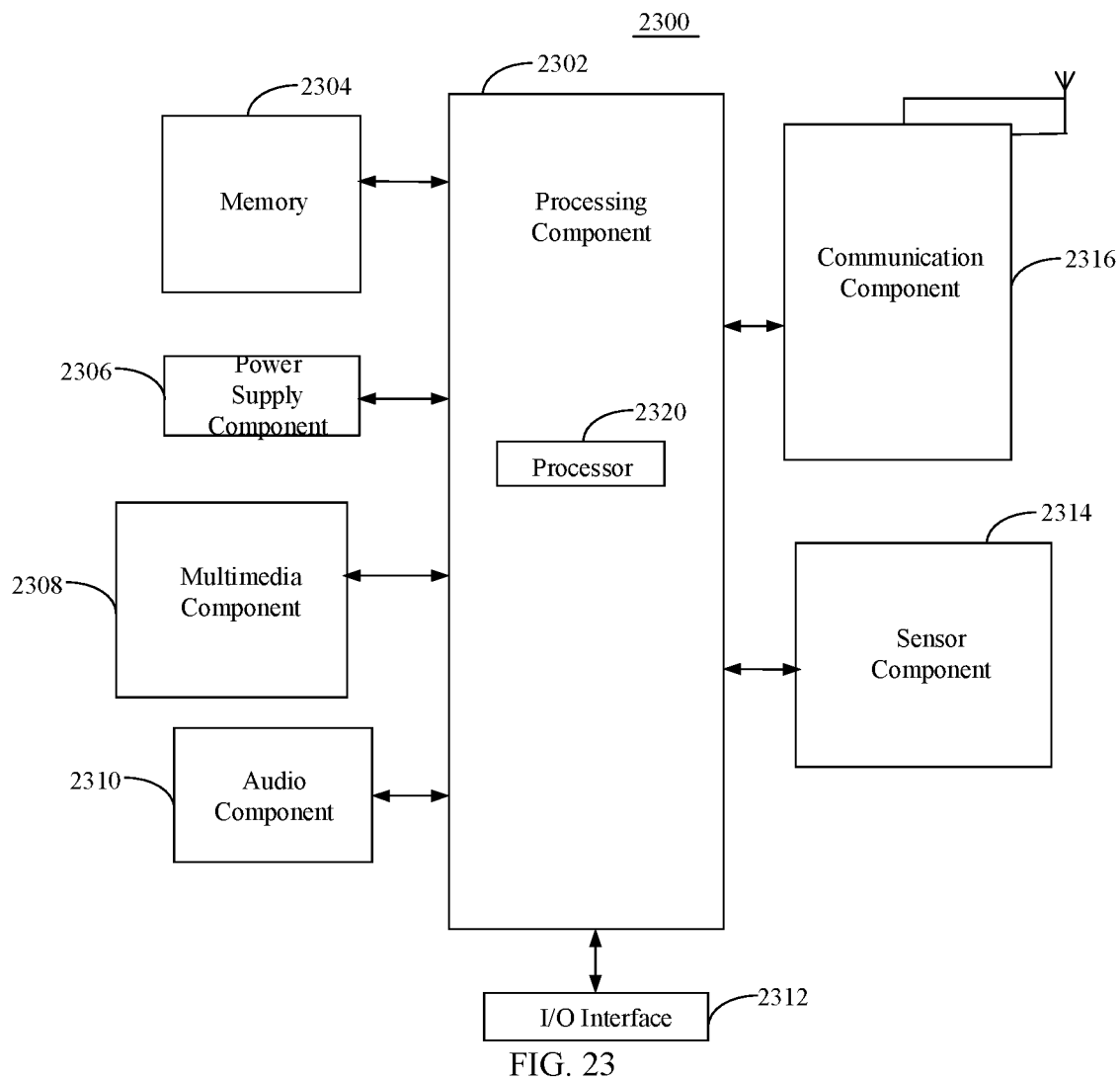
FIG. 23 is a schematic structural diagram illustrating user equipment according to an exemplary embodiment of the present disclosure.

FIG. 23 is a schematic structural diagram of a terminal 2300 according to an exemplary embodiment. For example, the terminal 2300 may be a user equipment, which may specifically be a mobile phone, a computer, a digital broadcasting terminal, a messaging device, a game console, a tablet device, a medical device, a fitness device, a personal digital assistant, and wearable devices such as smart watches and smart devices glasses, smart bracelets, smart running shoes, etc.

Referring to FIG. 23, the terminal 2300 may include one or more of the following components: a processing component 2302, a memory 2304, a power supply component 2306, a multimedia component 2308, an audio component 2310, an input/output (I/O) interface 2312, a sensor component 2314, and a communication component 2316.

The processing component 2302 generally controls overall operations of the terminal 2300, such as operations associated with display, telephone calls, data communication, camera operations, and recording operations. The processing component 2302 may include one or more processors 2320 to execute instructions to complete all or part of the steps of the foregoing method. In addition, the processing component 2302 may include one or more modules to facilitate interaction between the processing component 2302 and other components. For example, the processing component 2302 may include a multimedia module to facilitate the interaction between the multimedia component 2308 and the processing component 2302.

The memory 2304 is configured to store various types of data to support operations on the terminal 2300. Examples of these data include instructions for any application or method operated on the terminal 2300, contact data, phone book data, messages, pictures, videos, etc. The memory 2304 can be implemented by any type of volatile or non-volatile storage device or their combination, such as Static Random-Access Memory (SRAM), Electrically Erasable Programmable Read-Only Memory (EEPROM), Erasable Programmable Read-Only Memory (EPROM), Programmable Read-only Memory (PROM), Read-Only Memory (ROM), magnetic memory, flash memory, magnetic disk or optical disk.

The power supply component 2306 provides power for various components of the terminal 2300. The power supply component 2306 may include a power management system, one or more power supplies, and other component associated with generation, management, and distribution of power for the terminal 2300.

The multimedia component 2308 includes a screen that provides an output interface between the terminal 2300 and the user. In some embodiments, the screen may include a liquid crystal display (LCD) and a touch panel (TP). In a case that the screen includes a touch panel, the screen may be implemented as a touch screen to receive signals input by the user. The touch panel includes one or more touch sensors to sense touch, sliding, and gestures on the touch panel. The touch sensor can not only sense a boundary of the touch or sliding action, but also detect a duration and a pressure related to the touch or sliding operation. In some embodiments, the multimedia component 2308 includes a front camera and/or a rear camera. In a case that the device 2300 is in an operation mode, such as a shooting mode or a video mode, the front camera and/or the rear camera may receive external multimedia data. Each front camera and rear camera may be a fixed optical lens system or have focal length and optical zoom capabilities.

The audio component 2310 is configured to output and/or input audio signals. For example, the audio component 2310 includes a microphone (MIC). In a case that the terminal 2300 is in an operation mode, such as a call mode, a recording mode, and a voice recognition mode, the microphone is configured to receive external audio signals. The received audio signal may be further stored in the memory 2304 or transmitted via the communication component 2316. In some embodiments of the present disclosure, the audio component 2310 further includes a speaker for outputting audio signals.

The I/O interface 2312 provides an interface between the processing component 2302 and peripheral interface modules. The above-mentioned peripheral interface module may be a keyboard, a click wheel, a button, and the like. These buttons may include, but are not limited to: a home button, a volume button, a start button, and a locking button.

The sensor component 2314 includes one or more sensors for providing the terminal 2300 with various status evaluations. For example, the sensor component 2314 can detect the ON/OFF status of the device 2300 and relative positioning of the components. For example, the components are the display and the keypad of the terminal 2300. The sensor component 2314 can further detect position change of the terminal 2300 or a component of the terminal 2300, presence or absence of contact between the user and the terminal 2300, orientation or acceleration/deceleration of the terminal 2300, and temperature change of the terminal 2300. The sensor assembly 2314 may include a proximity sensor configured to detect presence of nearby objects in a case that there is no physical contact. The sensor component 2314 may further include a light sensor, such as a CMOS or CCD image sensor, for imaging applications. In some embodiments of the present disclosure, the sensor component 2314 may further include an acceleration sensor, a gyroscope sensor, a magnetic sensor, a pressure sensor or a temperature sensor.

The communication component 2316 is configured to facilitate wired or wireless communication between the terminal 2300 and other devices. The terminal 2300 may access a wireless network under a communication standard, such as Wi-Fi, 2G, 3G, 4G LTE, 5G NR, or a combination thereof. In an exemplary embodiment of the present disclosure, the communication component 2316 receives a broadcast signal or broadcast related information from an external broadcast management system via a broadcast channel. In an exemplary embodiment, the communication component 2316 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology or other technologies.

In an exemplary embodiment of the present disclosure, the terminal 2300 may be implemented by one or more application specific integrated circuit (ASIC), digital signal processor (DSP), digital signal processing device (DSPD), programmable logic device (PLD), field programmable gate array (FPGA), controller, microcontroller, microprocessor, or other electronic component, to implement operations of the method as described above.

In an exemplary embodiment of the present disclosure, there is further provided a non-transitory computer-readable storage medium including instructions, such as a memory 2304 including instructions, which can be executed by the processor 2320 of the terminal 2300 to implement operations of any one of the methods of transmitting information as illustrated FIGS. 8 to 11. For example, the non-transitory computer-readable storage medium may be ROM, random access memory (RAM), CD-ROM, magnetic tape, floppy disk, optical data storage device, and etc.

One of ordinary skill in the art will easily conceive of other embodiments of the present disclosure after considering the specification and practicing the disclosure disclosed herein. This application is intended to cover any variants, applications, or adaptive modifications of the present disclosure. These variants, applications, or adaptive modifications follow the general principles of the present disclosure and include common knowledge or conventional technical means in the technical field that are not disclosed in the present disclosure. The description and the embodiments are to be regarded as exemplary only, and the true scope and spirit of the present disclosure are pointed out by the following claims.

It should be understood that the present disclosure is not limited to the exact structures that has been described above and illustrated in the figures, and various modifications and variants can be made without departing from its scope. The scope of the present disclosure is only defined by the appended claims.

What is claimed is:

1. A method of transmitting information, applicable to a base station, and comprising:
   determining grant-free uplink transmission configuration information of at least two target UEs, the grant-free uplink transmission configuration information at least comprising listen before talk (LBT) detection configuration information of each of the at least two target UEs, the LBT detection configuration information configured to distinguish respective LBT detection priorities of the at least two target UEs for channel collision avoidance, wherein the at least two target UEs share periodic uplink transmission resources in an unlicensed spectrum; and
   transmitting, to each of the at least two target UEs, the grant-free uplink transmission configuration information, so that any one of the at least two target UEs performs an LBT detection according to the grant-free uplink transmission configuration information, and transmits uplink service data through a currently shared uplink transmission resource after the LBT detection succeeds;
   wherein before determining the grant-free uplink transmission configuration information of the at least two target UEs, the method further comprises:
   determining the at least two target UEs according to uplink transmission demand information of respective UEs within a preset time range;
   wherein determining the at least two target UEs according to the uplink transmission demand information of the respective UEs within the preset time range comprises:
   determining a total amount of uplink transmission demand of at least two participating UEs that are to share the periodic uplink transmission resources within the preset time range;
   comparing the total amount of uplink transmission demand with an amount of periodic uplink transmission resources within the preset time range;
   in response to determining that the total amount of uplink transmission demand is not greater than the amount of periodic uplink transmission resources, the participating UEs that are to share periodic uplink transmission resources are determined as the target UEs.

2. The method according to claim 1, wherein determining the grant-free uplink transmission configuration information of the at least two target UEs comprises:
   determining an LBT detection priority of each of the at least two target UEs; and
   determining a corresponding LBT detection configuration information according to different LBT detection priorities of the at least two target UEs.

3. The method according to claim 2, wherein the LBT detection configuration information comprises:
   indication information of an LBT detection starting times of each of the at least two target UEs.

4. The method according to claim 3, wherein the LBT detection configuration information further comprises a preset clear channel assessment (CCA) measurement value.

5. The method according to claim 3, wherein the indication information of the LBT detection starting time includes any one of followings:
   a detection starting time;
   a preset time offset; and
   a preset time index value indicating the preset time index value of the detection starting time.

6. The method according to claim 2, wherein the LBT detection configuration information comprises:
   different CCA measurement values for respective target UEs, wherein the CCA measurement values are integers greater than zero.

7. The method according to claim 1, wherein the grant-free uplink transmission configuration information further comprises: extension indication information of the LBT detection window.

8. A communication method comprising the method according to claim 1, further comprising a method of transmitting information, for user equipment (UE), which is a participating UE that shares periodic uplink resource in an unlicensed spectrum, the method of transmitting information for the UE comprising:
   receiving, from the base station, a grant-free uplink transmission configuration at least comprising LBT detection configuration information for the UE for channel collision avoidance, the LBT detection configuration information configured to indicate an LBT detection priority configured by the base station for the UE;
   determining LBT detection information of the UE according to the LBT detection configuration information; and
   performing an LBT detection on periodic shared uplink transmission resources according to the LBT detection information, and performing information transmission according to a detection result.

9. The method according to claim 8, wherein the LBT detection configuration information of the UE comprises indication information of the LBT detection starting time for the UE;
   determining the LBT detection information for the terminal for channel collision avoidance according to the LBT detection configuration information comprises: and
   determining a LBT detection starting time of the UE according to the indication information of the LBT detection starting time.

10. The method according to claim 9, wherein the indication information of the LBT detection starting time comprises a preset time offset;
    determining the LBT detection starting time of the UE according to the indication information of the LBT detection starting time comprises:
    determining the LBT detection starting time of the UE according to a starting time of the LBT detection window and the preset time offset.

11. The method according to claim 9, wherein the indication information of the LBT detection starting time comprises a preset time index value indicating the LBT detection starting time;

determining the LBT detection starting time of the UE according to the indication information of the LBT detection starting time comprises:

determining an LBT detection starting time corresponding to the present time index value by looking up a preset detection time list according to the preset time index value, wherein the preset detection time list comprises a correspondence between a time index value and the preset LBT detection starting time.

12. The method according to claim 9, wherein performing the LBT detection on the periodic shared uplink transmission resources according to the LBT detection information comprises:

generating a clear channel assessment (CCA) measurement random number;

starting an LBT detection in an LBT detection window of the shared uplink transmission resources in a case that the periodic shared uplink transmission resources arrive;

determining that the LBT detection succeeds in a case that the number of idle unit time-frequency resources detected in the LBT detection window reaches the CCA measurement random number; and determining that the LBT detection fails in a case that the number of idle unit time-frequency resources detected in the LBT detection window is less than the CCA measurement random number.

13. The method according to claim 9, wherein the LBT detection configuration information for the UE further comprises: a preset clear channel assessment (CCA) measurement value;

performing the LBT detection on the periodic shared uplink transmission resources according to the LBT detection information comprises:

starting the LBT detection in the LBT detection window of the shared uplink transmission resources according to the LBT detection starting time in a case that the periodic shared uplink transmission resources arrive;

determining that the LBT detection succeeds in a case that the number of idle unit time-frequency resources detected in the LBT detection window reaches the CCA measurement value; and determining that the LBT detection fails in a case that the number of idle unit time-frequency resources detected in the LBT detection window is less than the CCA measurement value.

14. The method according to claim 8, wherein the LBT detection configuration information for the UE comprises a preset clear channel assessment (CCA) measurement value for the UE;

performing the LBT detection on the periodic shared uplink transmission resources according to the LBT detection information comprises:

performing an LBT detection at a starting time of the LBT detection window of the shared uplink transmission resources in a case that the periodic shared uplink transmission resources arrive;

determining that the LBT detection succeeds in a case that the number of idle unit time-frequency resources detected in the LBT detection window reaches the CCA measurement value; and determining that the LBT detection fails in a case that the number of idle unit time-frequency resources detected in the LBT detection window is less than the CCA measurement value.

15. A base station implementing the method of claim 1, comprising:

a processor;

memory, configured to store instructions executable by the processor;

wherein, in response to that the instructions are executed, the processor is configured to perform operations of the method.

16. A communication system implementing the communication method of claim 8, comprising the base station and the UE, the UE comprising:

a processor;

memory, configured to store instructions executable by the processor;

wherein, in response to that the instructions are executed, the processor is configured to perform operations of the method of transmitting information for the UE.

17. A communication system implementing the method of claim 1, comprising the base station, wherein in a case of determining the grant-free uplink transmission configuration information for a plurality of target UEs that share the same uplink transmission resources, the base station is configured to designate different LBT detection priorities for respective target UEs, such that the respective target UEs perform LBT detection in the LBT detection window of the shared uplink transmission resources according to the LBT detection priority designated by the base station, thereby effectively utilizing the shared uplink transmission resources, avoiding transmission collision events, and improving reliability that the plurality of target UEs perform uplink transmission through the shared uplink transmission resources in the unlicensed spectrum.

18. A method of transmitting information, applicable to a base station, and comprising:

determining grant-free uplink transmission configuration information of at least two target UEs, the grant-free uplink transmission configuration information at least comprising listen before talk (LBT) detection configuration information of each of the at least two target UEs, the LBT detection configuration information configured to distinguish respective LBT detection priorities of the at least two target UEs for channel collision avoidance, wherein the at least two target UEs share periodic uplink transmission resources in an unlicensed spectrum; and transmitting, to each of the at least two target UEs, the grant-free uplink transmission configuration information, so that any one of the at least two target UEs performs an LBT detection according to the grant-free uplink transmission configuration information, and transmits uplink service data through a currently shared uplink transmission resource after the LBT detection succeeds;

wherein the grant-free uplink transmission configuration information further comprises: extension indication information of the LBT detection window;

wherein the grant-free uplink transmission configuration information further comprises: adjustment information of the shared transmission resources, the adjustment information configured to instruct the target UE to expand a time-frequency range of each of the shared uplink transmission resources;

the method further comprises: transmitting the adjustment information of the shared transmission resources to an associated UE, so that the associated UE adjusts its own transmission timing according to the adjustment information of the shared transmission resources, wherein the associated UE is a non-participating terminal whose range of transmission resources is affected.

\* \* \* \* \*